(12) United States Patent
Zhang et al.

(10) Patent No.: US 12,001,411 B2
(45) Date of Patent: Jun. 4, 2024

(54) METHOD AND SYSTEM FOR IMPROVING EFFICIENCY IN THE MANAGEMENT OF DATA REFERENCES

(71) Applicant: Veritas Technologies LLC, Santa Clara, CA (US)

(72) Inventors: Xianbo Zhang, Plymouth, MN (US); Jialun Liu, Shoreview, MN (US); Weibao Wu, Vadnais Heights, MN (US)

(73) Assignee: Veritas Technologies LLC, Santa Clara, CA (US)

( * ) Notice: Subject to any disclaimer, the term of this patent is extended or adjusted under 35 U.S.C. 154(b) by 0 days.

(21) Appl. No.: 18/161,592

(22) Filed: Jan. 30, 2023

(65) Prior Publication Data

US 2023/0185785 A1 Jun. 15, 2023

Related U.S. Application Data

(63) Continuation of application No. 16/380,730, filed on Apr. 10, 2019, now Pat. No. 11,567,913.

(51) Int. Cl.
*G06F 16/00* (2019.01)
*G06F 16/215* (2019.01)
*G06F 16/23* (2019.01)

(52) U.S. Cl.
CPC ........ *G06F 16/215* (2019.01); *G06F 16/2358* (2019.01)

(58) Field of Classification Search
CPC ............... G06F 16/2358; G06F 16/215; G06F 11/1453; G06F 3/0641; G06F 3/065; G06F 16/184; G06F 16/1844; G06F 16/29; G06F 3/0608; G06F 3/067; G06F 11/1469; G06F 3/0652; G06F 2201/80; G06F 11/1471;
(Continued)

(56) References Cited

U.S. PATENT DOCUMENTS 6,618,822 B1 * 9/2003 Loaiza ................ G06F 16/2358
714/6.1
8,392,376 B2 3/2013 Guo
(Continued)

OTHER PUBLICATIONS

Efstathopoulos, Petros, and Fanglu Guo. "Rethinking Deduplication Scalability." (2010), USENIX Association. (Year: 2010).*
(Continued)

*Primary Examiner* — Shyue Jiunn Hwa
(74) *Attorney, Agent, or Firm* — Campbell Stephenson LLP

(57) ABSTRACT

Methods, computer program products, and computer systems for the management of data references in an efficient and effective manner are disclosed. Such methods, computer program products, and computer systems include receiving a change tracking stream at the computer system, identifying a data object group, and performing a deduplication management operation on the data object group. The change tracking stream is received from a client computing system. The change tracking stream identifies one or more changes made to a plurality of data objects of the client computing system. The identifying is based, at least in part, on at least a portion of the change tracking stream. The data object group represents the plurality of data objects.

21 Claims, 18 Drawing Sheets

(58) Field of Classification Search
CPC ............... G06F 12/0253; G06F 3/0683; G06F 2212/1044; G06F 16/1748; G06F 16/2365; G06F 16/2477
See application file for complete search history.

(56) References Cited

U.S. PATENT DOCUMENTS

| | | | |
|---|---|---|---|
| 8,954,398 B1 | | 2/2015 | Zhang et al. |
| 9,626,253 B1 | | 4/2017 | Zhang et al. |
| 9,792,316 B1 | | 10/2017 | Cremelie |
| 9,946,605 B2 | | 4/2018 | Zhang et al. |
| 2007/0043733 A1 | * | 2/2007 | Cannon .................... G06F 16/22 |
| 2008/0243885 A1 | * | 10/2008 | Harger ..................... G06F 16/21 |
| 2010/0332456 A1 | | 12/2010 | Prahlad et al. |
| 2011/0167096 A1 | | 7/2011 | Guo et al. |
| 2011/0258404 A1 | | 10/2011 | Arakawa et al. |
| 2014/0114933 A1 | | 4/2014 | Chandrasekarasatry et al. |
| 2014/0212053 A1 | * | 7/2014 | Horiuchi ............. G06F 16/2358 382/218 |
| 2017/0344579 A1 | * | 11/2017 | Basireddy .............. G06F 16/137 |
| 2018/0253254 A1 | * | 9/2018 | Jain ....................... G06F 3/0673 |
| 2018/0253255 A1 | | 9/2018 | Jain et al. |
| 2020/0134082 A1 | * | 4/2020 | Harrington ............ G06F 16/215 |

OTHER PUBLICATIONS

International Search Report and Written Opinion of the International Application No. PCT/US2020/025954, dated Jul. 30, 2020, 9 pages.

\* cited by examiner

Group Creation Process
900

Group Deletion
Process
1300

METHOD AND SYSTEM FOR IMPROVING EFFICIENCY IN THE MANAGEMENT OF DATA REFERENCES

CROSS-REFERENCE TO RELATED APPLICATIONS

The present patent application is a continuation of U.S. Pat. No. 11,567,913, filed on Apr. 10, 2019, entitled "METHOD AND SYSTEM FOR IMPROVING EFFICIENCY IN THE MANAGEMENT OF DATA", issued on Jan. 31, 2023, and having X. Zhang, J. Liu, and W. Wu as inventors, which is incorporated by reference herein in its entirety and for all purposes.

FIELD OF THE INVENTION

The present disclosure relates to the backup of data, and more particularly, to methods and systems for improving efficiency in the management of data references.

BACKGROUND

An ever-increasing reliance on information and computing systems that produce, process, distribute, and maintain such information in its various forms, continues to put great demands on techniques for providing data storage and access to that data storage. Business organizations can produce and retain large amounts of data. While data growth is not new, the pace of data growth has become more rapid, the location of data more dispersed, and linkages between data sets more complex. Data deduplication offers business organizations an opportunity to dramatically reduce an amount of storage required for data backups and other forms of data storage and to more efficiently communicate backup data to one or more backup storages sites.

Generally, a data deduplication system provides a mechanism for storing a unit of information only once. Thus, in a backup scenario, if a unit of information is stored in multiple locations within an enterprise, only one copy of that unit of information will be stored in a deduplicated backup storage volume. Similarly, if the unit of information does not change during a subsequent backup, another copy of that unit of information need not be stored, so long as that unit of information continues to be stored in the deduplicated backup storage volume. Data deduplication can also be employed outside of the backup context, thereby reducing the amount of information needing to be transferred and the active storage occupied by duplicate units of information.

SUMMARY

The present disclosure describes methods, computer program products, computer systems, and the like are disclosed that provide for the management of data references in an efficient and effective manner. Such methods, computer program products, and computer systems include receiving a change tracking stream at the computer system, identifying a data object group, and performing a deduplication management operation on the data object group. The change tracking stream is received from a client computing system. The change tracking stream identifies one or more changes made to a plurality of data objects of the client computing system. The identifying is based, at least in part, on at least a portion of the change tracking stream. The data object group represents the plurality of data objects.

In one embodiment, the method further includes creating the data object group, where the creating includes creating a data object group record, identifying the plurality of data objects, and associating the plurality of data objects with the data object group.

In one embodiment, the method further includes including, in the data object group record, a data object identifier for each of the plurality of data objects, where the data object identifier is included in a plurality of data object identifiers.

In one embodiment, the change tracking stream includes the plurality of data object identifiers and information identifying a change to each data object of the plurality of data objects. Each of the plurality of data object identifiers identifies a data object of the plurality of data objects.

In one embodiment, the method further includes determining a data object group identifier of the data object group, including the data object group identifier in the data object group record, and creating a data object group reference to the data object group record, using the data object group identifier. In one embodiment, the deduplication management operation includes at least one of a group creation operation, a group update operation, a group merge operation, or a group deletion operation.

In one embodiment, the data object group is one of a plurality of data object groups. In such an embodiment, a first change affects a first data object of a first data object group of the plurality of data object groups, and a second change affects a second data object of a second data object group of the plurality of data object groups.

In such an embodiment, the deduplication management operation is a group update operation, and further includes creating another data object group including the first data object and the second data object, deleting the first data object from the first data object group, and deleting the second data object from the second data object group.

In one embodiment, the data object group is one of a plurality of data object groups. In such an embodiment, a first change affects a first data object of a first data object group of the plurality of data object groups, and a second change affects a second data object of a second data object group of the plurality of data object groups.

In such an embodiment, the deduplication management operation is a group merge operation, and further includes creating another data object group including one or more data objects from the first data object group, other than the first data object, and one or more data objects from the second data object group, other than the second data object, deleting the first data object group, and deleting the second data object group.

BRIEF DESCRIPTION OF THE DRAWINGS

Embodiments of methods and systems such as those disclosed herein may be better understood, and its numerous objects, features, and advantages made apparent to those skilled in the art by referencing the accompanying drawings.

Figure 1:
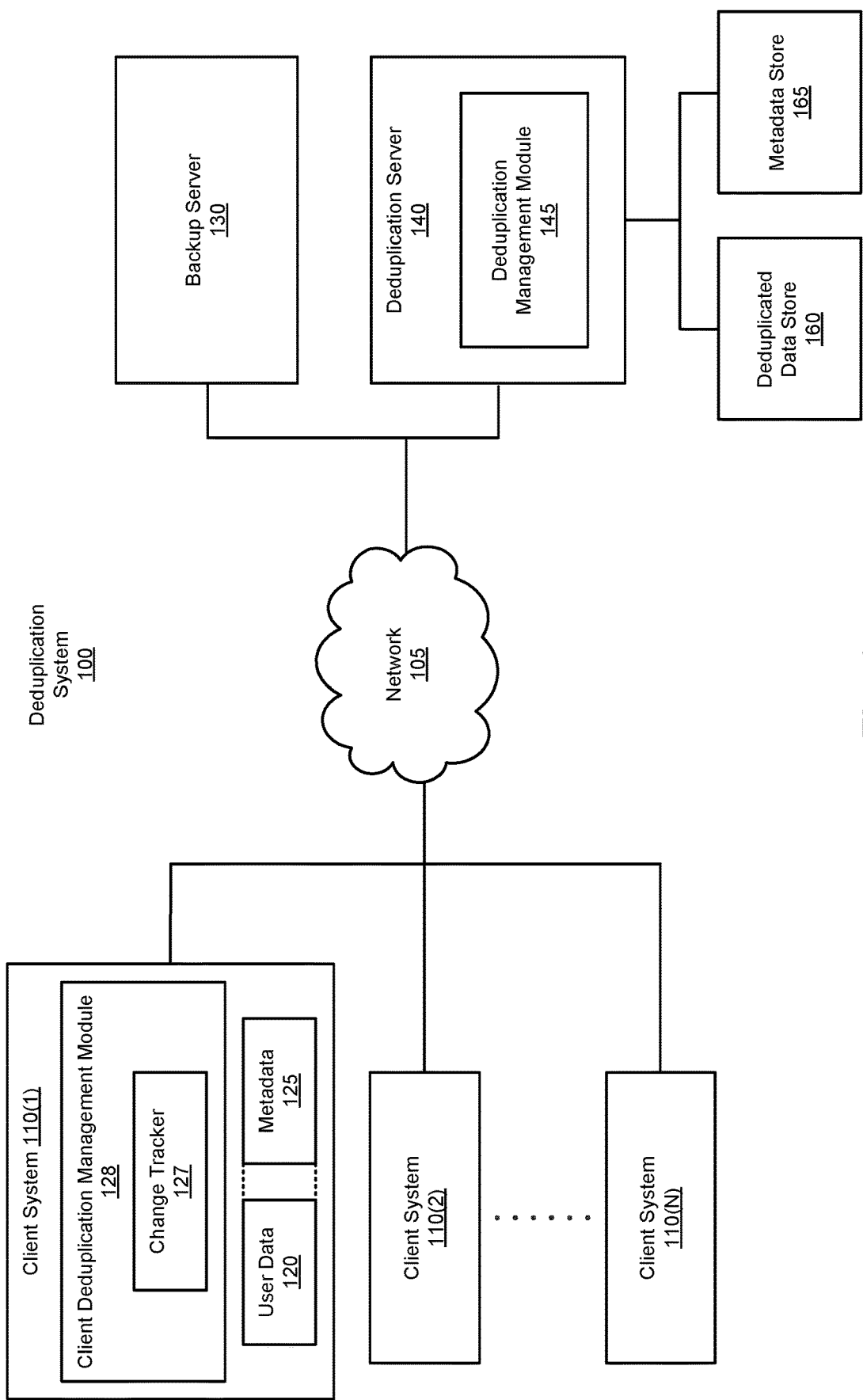
FIG. 1 is a simplified block diagram illustrating components of an example of a deduplication system, according to embodiments of methods and systems such as those disclosed herein.

While embodiments such as those presented in the application are susceptible to various modifications and alternative forms, specific embodiments are provided as examples in the drawings and description of example embodiments. It should be understood that the drawings and description of example embodiments are not intended to limit the embodiments to the particular form disclosed. Instead, the intention is to cover all modifications, equivalents and alternatives falling within the spirit and scope of methods and systems such as those described herein, as defined by the appended claims.

DETAILED DESCRIPTION

Introduction

Broadly, the concepts described herein are applicable to the backup of data, and more particularly, to methods and systems for improving the efficiency with which data references are managed. More specifically still, methods and systems such as those described herein provide for the efficient management of data references in systems providing backup functionality that employs deduplication techniques.

Methods and systems such as those disclosed herein provide flexible, efficient, and effective techniques for maintaining references to deduplicated data segments, particularly as the number of storage constructs (e.g., files) increases.

As will be appreciated, a fingerprinting algorithm is an algorithm that maps a data segment to a smaller data structure (e.g., of shorter length), referred to generically herein as a fingerprint. A fingerprint uniquely identifies the data segment and is typically used to avoid the transmission and comparison of the more voluminous data that such a fingerprint represents. For example, a computing system can check whether a file has been modified, by fetching only the file's fingerprint and comparing the fetched fingerprint with an existing copy. That being the case, such fingerprinting techniques can be used for data deduplication, by making a determination as to whether a given unit of data (e.g., a file, portion there of (e.g., a data segment), or the like) has already been stored. An example of a fingerprint is a hash value. Hashing algorithms such as Message-Digest Algorithm 5 (MD5), Secure Hash Algorithm 1 (SHA-1), and Secure Hash Algorithm 256 (SHA-256) and the like can be used to generate hash values for use as fingerprints.

The function of a hashing algorithm is a function that can be used to map original data of (what can be arbitrary) size onto data of a fixed size, and in so doing, produce a value (a hash value) that is unique (with a sufficiently high level of confidence) to the original data. The input data is typically referred to as the "message" and the hash value is typically referred to as the "message digest" or simply "digest."

During a backup, clients and/or computing systems may present duplicate data within a set of data that is to be backed up. In addition, if a set of data is backed up multiple times, the data that is unchanged also results in duplicates of previously backed up data. In order to prevent backing up duplicate data from one or more clients, backup systems can implement deduplication, which removes duplicate copies of data while keeping track of how the stored unique data is being referenced. Deduplication can be used not only to preserve storage space when backing up data from client systems, but also avoids the unnecessary transfer of duplicate data.

However, while the advantages provided by data deduplication will be appreciated from the foregoing, situations exist in which the need to reference data segments for a large number of files can prove problematic. This is because, as will be described in further detail subsequently, a reference to each data construct (e.g., each file) is used as part of the data structures employed to organize and keep track of the units of data (e.g., data segments) that make up the data construct in question. Further complicating the management of such references are changes made to such data constructs (e.g., including changes to the data constructs' contents, the moving of such data constructs from one location in the given file system to another, the renaming of such data constructs (or the location in which they are stored), the deletion of such data constructs, and other operations to which such data constructs may be subjected). Such problems are only compounded if the file system in which such data constructs are stored allows for shared access to such data constructs and the number of such data constructs to increase. One issue such operations and situations give rise to is an increase in the number of accesses storage unit(s) in which such constructs are stored. As will be appreciated in light of the present disclosure, such problems can become particularly acute when a backup system accesses data constructs directly, and even more so when such data constructs are shared between users.

To address such issues, methods and systems such as those described herein group references to data constructs (e.g., files) into what are referred to herein as group references, which provide a reference for the data constructs (e.g., files) referenced as data construct groups (also referred to herein as file groups). In terms of files, such methods and systems can employ a file change tracking list, or other construct that provides for the tracking of changes to the data in question, and so the maintenance of such group references.

For example, and as will be explained in detail subsequently, such a file change tracking list can thus be divided into changes made to each group of files in their respective file groups, and deduplication management operations (e.g., data object (DO) writes, container reference updates, and path object updates (PO updates; a PO being a mapping between a user-perceived file and its corresponding data object)) performed at file group level, rather than at the individual file level. In so doing, the number of storage input/output (I/O) operations involved in performing the aforementioned deduplication operations is reduced significantly.

In creating file groups, a determination can be made as to the manner in which the given files will be grouped. For example, in one embodiment, a group size can be determined by using two thresholds: the number of files to be included in a given file group, and the amount of data in the given file group. As will be appreciated in light of the present disclosure, such characteristics need not be used in combination, and can be used in conjunction with other (or multiple) characteristics of the files (or other data storage constructs), including grouping based on characteristics such as the number of storage I/O operations performed on the data storage construct in question during a given period of time (thereby grouping such data storage constructs by the amount of activity experienced by each such data storage construct), organization of systems and/or that of the data storage constructs being backed up, the frequency of changes made to the data storage constructs in question (e.g., as by a change in name, location, and/or the like), and/or other such characteristics. As also will be appreciated in light of the present disclosure, a goal in grouping such data storage constructs is increasing the efficiency which references to such data storage constructs are managed, by grouping such data storage constructs (and so, their references) in order to, for example, reduce the number of references needed (and so, reduce the number of deduplication operations associated therewith, as a result of there being fewer such references), localize data storage constructs having a relatively higher frequency of the aforementioned changes to a smaller number of references, and so on.

Example Deduplication Architectures

FIG. 1 is a simplified block diagram illustrating components of an example of a deduplication system (depicted, for example, as a deduplication system 100), in which the present disclosure can be implemented. Deduplication system 100 includes a network 105 that communicatively couples one or more client systems 110(1)-(N), a backup server 130, and deduplication server 140 (includes a deduplication management module 145). Each component is discussed in further detail below.

One or more client systems 110(1)-(N), also referred to herein as client devices 110 and/or client systems 110, can be implemented using, for example, a desktop computer, a laptop computer, a workstation, a server, or the like. An example of such computing devices is described subsequently. One or more client systems 110(1)-(N) can be configured to communicate with backup server 130 and deduplication server 140 via network 105. An example of network 105, which can be used by client systems 110 to access backup server 130 and deduplication server 140, is a local area network (LAN) utilizing Ethernet, IEEE 802.11x, or some other communications protocol. While FIG. 1 illustrates client system 110(1) including user data 120 and metadata 125 (and such being associated with one another, by dotted lines), each client system can store different user data 120 and metadata 125 in storage local to the client system.

Also shown as being implemented in client system 110(1) is a change tracker (illustrated in FIG. 1 as a change tracker 127). Change tracker 127 can be implemented, for example, as part of a client deduplication management module (illustrated in FIG. 1 as a client deduplication management module 128). Moreover, change tracker 127 can be implemented, for example, as a change block tracker, detecting data (e.g., data blocks) written by, for example, an application executed by client system 110(1). Such a change block tracker can track units of storage (e.g., disk sectors, data blocks, or the like) that have been changed, for example, by the aforementioned application. Such a list of changed units of storage is referred to herein as a data object change tracking list, or more specifically, a file change tracking list (and more generically as a change tracking stream). Once identified, such changed units of storage can be transferred from the computing system in question to a backup server (e.g., backup server 130) or a deduplication server (e.g., such as deduplication server 140), for example. In certain embodiments, such changed units of storage can be sent to a proxy server, for further conveyance to the proper destination, then or at a later time. As will be appreciated in light of the present disclosure, such an implementation is presented merely as an example, and such change tracking can be performed by any computing device shown in FIG. 1 (e.g., by deduplication server 140) and/or another computing device not shown in FIG. 1.

User data 120 can include various data that is generated and/or consumed by a user of client system 110(1). User data 120 can include executable files, such as those used to implement applications and operating systems, as well as files that are used or generated by such executable files. User data 120 can include files generated by user applications (e.g., word processing programs, email programs, graphics programs, a database application, or the like) executing on client system 110(1). Some of the user data 120 may also be transferred to backup server 130 and/or deduplication server 140 via a network 105 to be included in deduplicated data store 160, and the associated metadata (e.g., metadata 125). Each of client systems 110 can send different user data and metadata to backup server 130 and/or deduplication server 140.

Metadata 125 can include data about the user data 120. Metadata 125 can be generated by client system 110(1), such as during a backup process. Whenever a user (e.g., an application or human user) requests that client system 110 add all or part of user data 120 to the deduplicated data store 160 (e.g., as part of a regularly scheduled full or partial backup of the client system), client system 110(1) can read user data 120 and metadata 125 (or generate metadata 125 about user data 120), such as one or more identifiers (also referred to herein as signatures), that can identify different portions of user data 120. Client system 110 can provide metadata 125 as a list (e.g., a list of signatures) to deduplication server 140. Metadata 125 can be used by deduplication server 140 to determine whether a portion of user data 120 is not already stored in deduplicated data store 160 (and so should be added to the deduplicated data store 160, as further discussed below).

As noted, backup server 130 is also coupled to network 105. Backup server 130 can include one or more physical servers configured to perform a variety of tasks related to management and implementation of backup services for deduplication system 100, such as performing a full or partial backup of a client system. In deduplication system 100, backup server 130 is further configured to communicate with deduplication server 140 for purposes of storing backups of data from client systems 110(1)-(N) in resources controlled by deduplication server 140. Such communication can be via network 105 or via a direct link between the backup server 130 and deduplication server 140. Information that can be provided by backup server 130 to deduplication server 140 can include a unique identification associated with each data stream provided by one of client systems 110(1)-(N) to the deduplication server 140. The backup server 130 can also provide sequence number identification for to identify sequential data transmitted in each uniquely identified data stream. Deduplication server 140 (and more particularly, deduplication management module 145) can then use such information to associate received data streams from client systems 110(1)-(N) in accord with embodiments of the present invention, as further discussed subsequently.

Backup services can be implemented in deduplication system 100 as a client-server application (not shown), with a server component (e.g., residing in backup server 130) and a client component (e.g., residing on client systems 110) of the client-server application. A server component can be configured to communicate with a client component during a backup process. Certain functions of the backup services can be performed by the client and server components, where the functions may be divided between the two components, or may be performed completely by one component or the other, depending on the implementation of the backup application. For example, backup server 130 can be configured to perform tasks that include communicating with client systems 110 to initiate backup tasks on the clients, maintaining databases related to files and other information backed up from file systems associated with the clients, and managing or tracking resources storing backups of client systems 110.

Deduplication server 140 is also coupled to network 105 and performs a variety of tasks related to management and implementation of deduplication services for the system illustrated in FIG. 1. Deduplication server 140 can include one or more physical servers configured to perform a variety of tasks related to deduplication services, which can be managed by deduplication management module 145. For example, deduplication server 140 can provide deduplication services for eliminating duplicated data content in a backup context. Deduplication services help reduce an amount of storage needed to store backups of enterprise data (e.g., user data 120) by providing a mechanism for storing a piece of information only one time. Such storage can be managed by deduplication management module 145. Thus, in a backup context, if a piece of information is stored in multiple locations within an enterprise (e.g., on multiple client systems 110), that piece of information will only be stored one time in a deduplicated backup storage area, such as deduplicated data store 160. Also, if the piece of information does not change between a first backup and a second backup, then that piece of information will not be stored during the second backup as long as that piece of information continues to be stored in the deduplicated backup storage area. Data deduplication can also be employed outside of the backup context, thereby reducing the amount of active storage occupied by duplicated files.

Deduplication services can be implemented in the deduplication system 100 as a client-server application (not shown), with a server component (e.g., residing on deduplication server 140) and a client component (e.g., residing on client systems 110) of the client-server application. For example, during a backup process for storing a backup of user data 120 in deduplicated data store 160, a client component of the deduplication services can be configured to generate metadata 125 about user data 120, such as one or more identifiers, or signatures, that can identify different portions of user data 120, and to communicate metadata 125 to a server component, which is discussed further below. Certain functions of the deduplication services can be performed by the client and server components, where the functions may be divided between the two components, or may be performed completely by one component or the other, depending on the implementation of the backup application.

Deduplication server 140 is in turn coupled to network storage for deduplicated data that includes a deduplicated data store 160 and a metadata store 165. Deduplicated data store 160 is a storage area in which deduplicated data can be stored. Deduplicated data store 160 can be configured as single instance storage. In single instance storage, only a single instance of a piece of data is stored. A common use of single instance storage is for maintaining data backups for servers and other computing clients in a network. For each backup, only a single instance of information duplicated in deduplication system 100 will be stored in the single instance storage area. In addition, for subsequent backups occurring over time, data items that have not changed from one backup to another need not be stored in the subsequent backup. In this manner, significant savings in data storage space can be realized by eliminating duplicated data content.

Metadata store 165 is a storage area that contains various metadata regarding the deduplicated data stored in deduplicated data store 160, such as information regarding backup images stored in deduplicated data store 160 (also referred to herein as a catalog), including, in certain embodiments, references to the files included in a given backup. It is these references (e.g., file references) to which methods and systems such as those described herein are directed, with regard to improving the efficiency with which such references are managed. That being the case, metadata store 165 is configured with data constructs and structures, such as those described subsequently herein, in order to facilitate performance of processes such as those also described subsequently herein.

The various metadata (including metadata 125) can be stored in, among other locations, a central index. For example, deduplication server 140 can use metadata 125, such as the list of signatures from client systems 110, to determine if portions of a backup image (e.g., portions of user data 120) are non-duplicative of portions already stored in deduplicated data store 160. Once deduplication server 140 determines that a portion of user data 120 is not duplicative of the data already stored in deduplicated data store 160 and thus should be added to the deduplicated data store 160, deduplication server 140 can store a corresponding identifier, or signature, of the portion of user data 120 in the central index. Deduplication server can request the non-duplicative portions (or unique portions) from client systems 110 by identifying the unique portion with the portion's associated signature.

As the unique portions are received via a data stream from client systems 110, the unique portions can be written into a fixed-size container (e.g., also referred to herein as a container file, and includes these and/or other storage construct) stored at deduplication server 140, such as in a cache or other storage unit. Once the container is full of unique data segments, in certain embodiments, the entire container can be written to a location in deduplicated data store 160. The container written to the deduplicated data store 160 can also include a local container index, which indicates a local location of each unique portion stored within the container. The local container index can contain a signature associated with each unique segment stored in the container, or alternatively can contain a shortened version of the signature of each unique segment stored in the container. Deduplication server 140 can maintain information identifying a container (e.g., a container identifier (a "container ID") of the container) in a central index as a location for each unique portion in the container. The signature of a unique portion can also be associated with the location of the unique portion in an entry of the central index, where the central index includes an entry for each portion stored in the deduplicated data store 160. Thus, an identification of a portion's location, or a container ID, can be found in the central index by using the signature of the portion as a key in the central index. The location of the portion within the container identified by the container ID can be found in the local container index of the container by using at least a part of the signature as a key in the local container index.

Multiple backup images can be stored in the deduplicated data store 160. For example, a first backup image can be captured from user data 120 and can be stored in deduplicated data store 160. A subsequent backup image captured from user data 120 can contain duplicate portions that are identical to portions of the first backup image already stored in deduplicated data store 160 and can contain unique portions that are not identical to portions of the first backup image (e.g., portions that correspond to changed user data 120). The unique portions of the subsequent backup image can be written to deduplicated data store 160, while the duplicate portions will not be written (since the duplicate portions are identical to instances of portions already stored in deduplicated data store 160). Since only single instances of portions of a backup image are stored in deduplicated data store 160, metadata store 165 can provide a mapping of a backup image to the various non-duplicative portions stored in deduplicated data store 160 that compose the backup image. Thus, a single backup image can be associated with multiple portions stored throughout the deduplicated data store 160, and multiple backup images can be associated with a single portion (e.g., the multiple backup images share the single portion). For example, the subsequent backup image can be associated with unique portions of the subsequent backup image that were written to deduplicated data store 160 and with unique portions of the first backup image that were previously written to the deduplicated data store 160. Metadata store 165 can store associations between a backup image and the portions that compose the backup image as a group of references or pointers, where each reference indicates an entry of the central index that corresponds to a portion included in the backup image.

As additional backup images are added to deduplicated data store 160, backup image data can become fragmented across deduplicated data store 160 as portions of changed user data 120 are stored. Thus, a recent backup image stored in deduplicated data store 160 may include portions of recently changed user data 120 contiguously located in deduplicated data store 160, and may include multiple references to previously changed user data associated with older backup images, which are stored in various non-contiguous locations throughout deduplicated data store 160. If a user were to restore the recent backup image from deduplicated data store 160, deduplication server 140 would have to read numerous portions of data associated with older backup images from across the various locations (e.g., various containers) in deduplicated data store 160. Thus, as a backup image becomes more fragmented, restoration of the backup image can become more inefficient due to the increasing amount of time spent on performing a growing number of access operations needed to read each portion of data of the backup image from various locations in deduplicated data store 160 (e.g., determining a location for each of the multiple portions from metadata store 165).

Deduplicated data store 160 and metadata store 165 can be stored in network storage. Network storage can be implemented as network attached storage (NAS), file servers, storage filers, and/or network shares. Network storage can be implemented as a single storage device or as a collection of storage devices. Network storage can also be implemented as a storage area network (SAN), which couples remote storage devices to a server (e.g., a storage server), such that the remote storage devices appear as locally-attached storage devices to the server's operating system (OS), for example. Network storage can include a data volume.

In light of the present disclosure, it will be appreciated that network storage can be implemented by any type of computer-readable storage medium, including, but not limited to, internal or external hard disk drives (HDD), optical drives (e.g., CD-R, CD-RW, DVD-R, DVD-RW, and the like), SSD and/or FLASH memory drives (e.g., USB memory sticks and the like), tape drives, removable storage in a robot or standalone drive, and the like. Alternatively, it will also be appreciated that, in light of the present disclosure, deduplication system 100 and network 105 can include other components such as routers, firewalls and the like that are not germane to the discussion of the present disclosure and will not be discussed further herein. It will also be appreciated that other configurations are possible. For example, client systems 110 can be directly coupled to deduplicated data store 160 and/or metadata store 170, and so on.

The letter N is used to indicate a variable number of devices or components. For example, a variable number of clients are implemented in the deduplication system. Although the letter N is used in describing a variable number of instances of each of these different devices and components, a repeated use of the letter N does not necessarily indicate that each device and component has a same number of N instances implemented in the deduplication system.

Figure 2A:
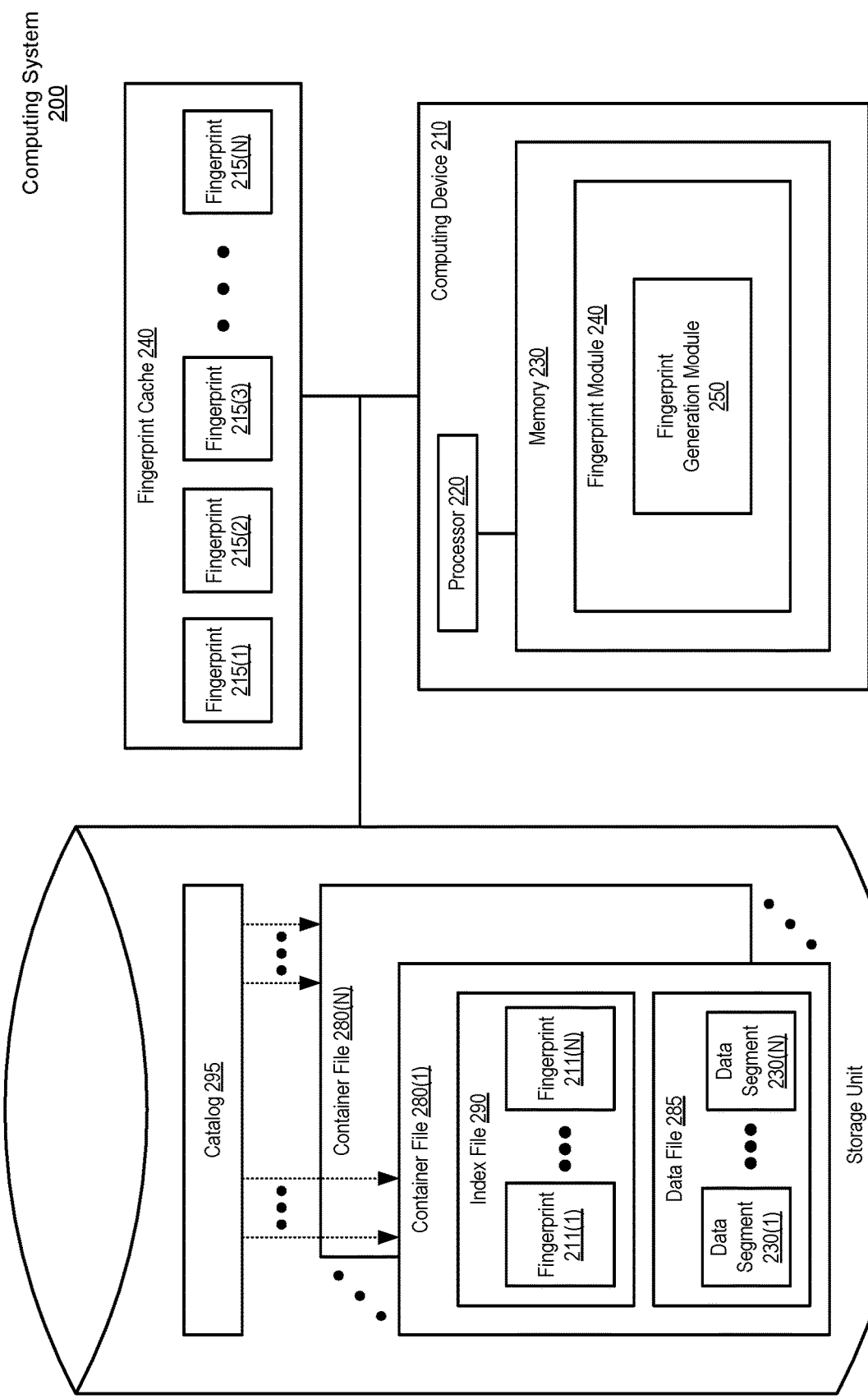
FIG. 2A is a simplified block diagram illustrating components of a computing system supporting deduplication, according to embodiments of methods and systems such as those disclosed herein.
Figure 2B:
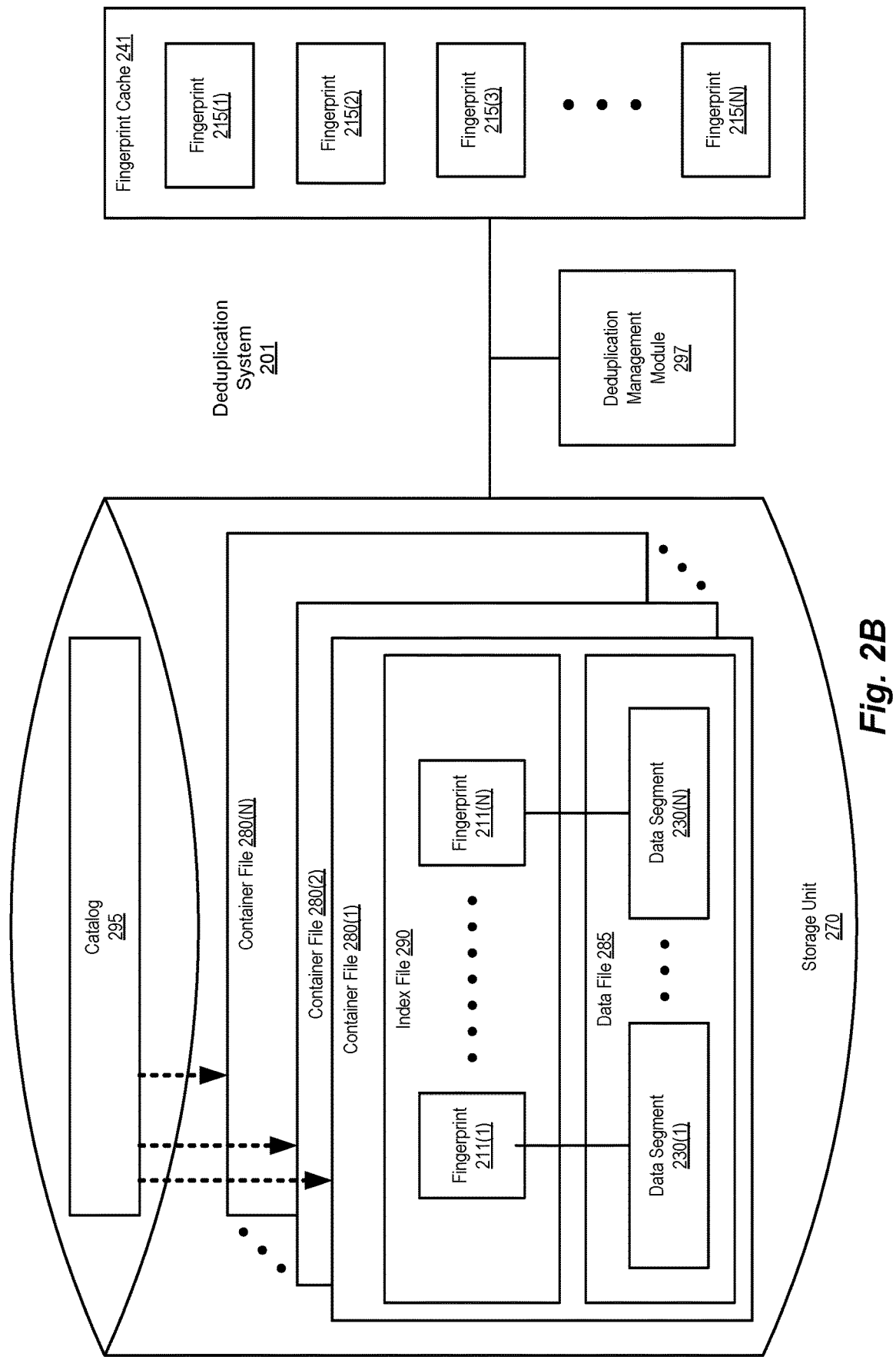
FIG. 2B is a block diagram of a computing system that stores multiple fingerprints and their associated data segments in a container file, according to embodiments of methods and systems such as those disclosed herein.

FIG. 2A is a block diagram of a computing system (which can be a client computing system or a server computing system, and which is depicted in FIG. 2A as a computing system 200; a deduplication system 201 is therefore depicted in FIG. 2B). Computing system 200 includes a computing device 210, a storage unit 270, and a fingerprint cache 240. As will be appreciated in light of the present disclosure, a fingerprint cache such as fingerprint cache 240, in certain embodiments, facilitates a determination as to whether data represented by a given fingerprint is stored in the system, as well as facilitating the identification of the container file in which the data in question (i.e., that represented by the given fingerprint) is stored. As shown, computing device 210 is communicatively coupled to storage unit 270 and fingerprint cache 240. Computing device 210 can be implemented using one or more of a variety of different types of computing devices, including a server, personal computing device, laptop computer, net book, personal digital assistant, cellular phone, or the like. It is noted that this is a simplified example, and that other embodiments can include far more complex organizational and configuration schemes than are shown here.

Computing device 210 includes a processor 220, and memory 230. Computing device 210 also includes a fingerprint module 240 which implements a fingerprint generation module 250. Fingerprint generation module 250 generates new fingerprints for a given data segment by implementing, for example, a fingerprint generation routine that generates a hash value corresponding to the given data segment. In this example, fingerprint generation module 250 implements a routine that uses a fingerprinting algorithm to generate a fingerprint (hash value).

Storage unit 270 stores a number of container files (e.g., such as one of container files 280(1)-(N), referred to herein for the sake of simplicity as container file 280, as an example of a container file and/or other such storage constructs) which includes a data file 285 and an index file 290. In this example, index file 290 stores fingerprints (e.g., fingerprints 211(1)-(N)) and data file 285 stores data segments (e.g., data segments 230(1)-(N)). Fingerprint cache 240 is a dedicated cache for storing fingerprints (depicted in FIG. 2A as fingerprints 215(1)-(N)). As will be appreciated in light of the present disclosure, the fingerprints stored in fingerprint cache 240 can represent not only data objects (e.g., data storage constructs such as files and the like), but can also represent data object groups (e.g., allowing a determination as to whether some portion of the data in a given data object of a data object group has changed, and so allow such determinations to be made with regard to large numbers of data objects quickly, thereby providing the potential for further improvement in the efficiency of such an approach). In the latter case, one or more of fingerprints 215 can represent corresponding file groups. In the scenario in which computing device 210 is a client computing system, the caching of file group fingerprints allows for a determination to be made as to whether a given file group exists, for example, on the deduplication server in question.

Computing device 210 is coupled to storage unit 270. In this example, storage 270 stores container file 280, but can also store data (not shown) in addition to container file 280, and can do so using other formats. Storage 270 can be a persistent storage device and can include one or more of a variety of different storage devices, including hard disks, compact discs, digital versatile discs, solid state drives (SSDs; e.g., FLASH memory), and the like, or one or more logical storage devices such as volumes implemented on one or more such physical storage devices.

Computing device 210 is also coupled to a fingerprint cache 240. In this example, fingerprint cache 240 can be main memory, an SSD, or even a file, and implements a cache such that data (e.g., frequently accessed fingerprints) can be served to computing device 210 in an expeditious manner to determine the existence of a given fingerprint and where the data represented by that fingerprint is stored, versus, for example, from a slower storage device (e.g., a hard disk drive (HDD)). However, fingerprint cache 240 can be implemented on one or more of a variety of different storage devices, including hard disks, compact discs, digital versatile discs, and the like, or on one or more logical storage devices such as volumes implemented on one or more such physical storage devices.

Computing device 210, storage unit 270, and fingerprint cache 240 can be integrated (e.g., where the storage device is coupled to the node's internal processing devices by an internal bus and is built within the same chassis as the rest of the node) or separate. If separate, computing device 210, storage unit 270, and fingerprint cache 240 can be coupled by a local connection or via one or more networks (e.g., local area networks (LANs) and/or wide area networks (WANs) (not shown)).

FIG. 2B is a block diagram of a computing system that stores multiple fingerprints and their associated data segments in a container file. In such a deduplication backup system (depicted in FIG. 2B as deduplication system 201), data storage constructs such as data segments (e.g., data segments 230(1)-(N)) are depicted as being stored in a data file (e.g., such as data file 285) of container file 280(1). Each container file includes an index file (e.g., such as index file 290) and a data file (e.g., such as data file 285). In this example, index file 290 stores fingerprints 211(1)-(N) and data file 285 stores data segments 230(1)-(N). In the embodiment depicted in FIG. 2B, each of fingerprints 211(1)-(N) corresponds to a corresponding one of data segments 230 (1)-(N). Also as shown in FIG. 2B, fingerprint cache 241 stores fingerprints 215(1)-(N). For example, after data segments and their associated fingerprints are stored in a container file 280, fingerprint cache 241 can be maintained to indicate that the data segment in question is stored in a container file 280 (and so is a duplicate). Further, in a manner comparable to that noted in connection with FIG. 2A, fingerprint cache 241 can store data object group fingerprints, and so provide the aforementioned further improvements in the efficiency of such an approach.

As before, fingerprints 215(1)-(N) can represent not only data storage constructs (e.g., the aforementioned data segments, and/or files or the like), but can also represent data storage construct groups, such as the file groups discussed elsewhere herein. In a deduplication backup systems that implement fingerprints, an index file can be employed to separately record fingerprint information, data segment location, and data segment size for each unique fingerprint associated with a data segment (e.g., <fp1, size1, offset1>, <fp2, size2, offset2>, and so on, as described, for example, in connection with FIG. 3B, subsequently). Also, the index file may contain other information about the data segments, including (but not limited to) information indicating whether the data segment is compressed, encrypted, or has other such characteristics that may need to be taken into account when accessing that data segment.

Deduplication system 201 can include, for example, a deduplication management module 297 to manage various of the aforementioned information. For example, deduplication management module 297 can manage insertion of fingerprints in index file 290, data segments in data file 285, storage of fingerprints in fingerprint cache 241, and references and other information in catalog 295. Further in this regard, deduplication management module 297 can perform or cause to be performed deduplication management operations such as those described elsewhere herein.

Figure 3B:
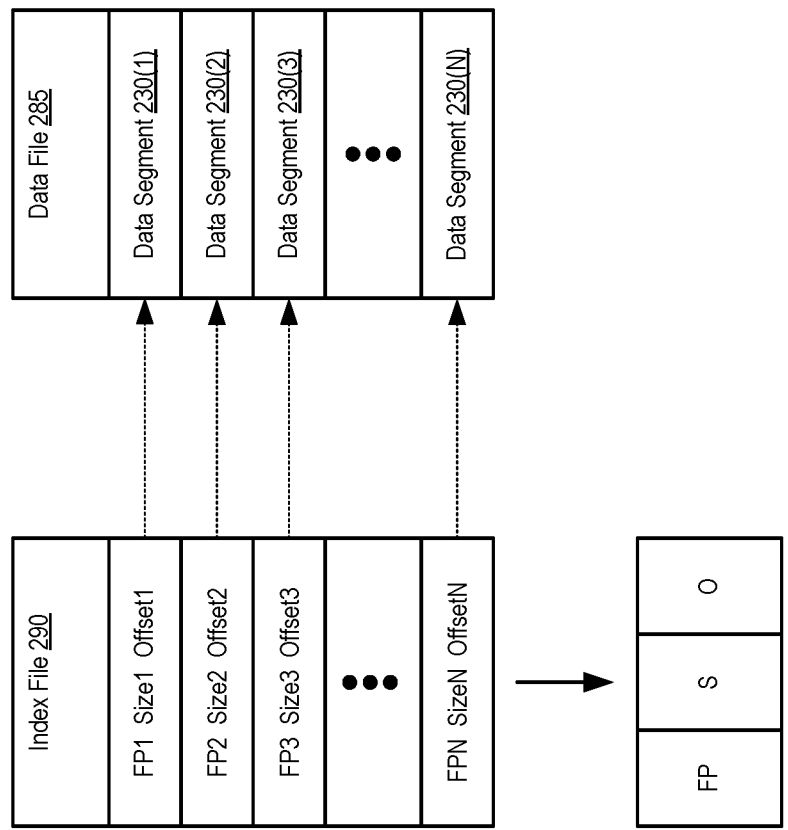
FIG. 3B is a simplified block diagram illustrating an example of the composition of index file, according to embodiments of methods and systems such as those disclosed herein.
Figure 3A:
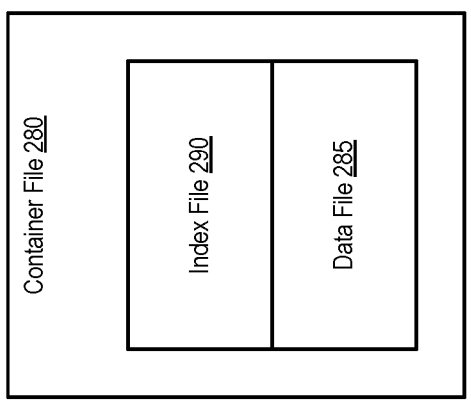
FIG. 3A is a simplified block diagram illustrating an example of the composition of a container file, according to embodiments of methods and systems such as those disclosed herein.

FIG. 3A is a simplified block diagram illustrating an example of the composition of container file 280, which, according to one or more embodiments, allows a backup operation to reference multiple fingerprints representing the data segments that make up a given data construct, such as a file. At the beginning of an initial backup operation, new data segments are written into the given container files (e.g., a container such as container file 280). At the end of the initial backup operation, a data object is stored in the newly-created container file. The data object can contain, for example, the following information: <fp1, size1, containerID1>, <fp2, size2, containerID2>, and so on. A data object typically corresponds to a backup image that includes the data segments to be backed up during a full or incremental backup operation. As will be also appreciated in light of the present disclosure, a data object may be represented by a fingerprint that is the hash value of the data object content.

According to one embodiment, at the beginning of a backup operation from the same client and/or backup policy that performed and/or requested the initial backup operation, data objects containing fingerprints of the last full backup operation (in this example, the initial backup operation) can be retrieved from container file 280. Data segments (or other data storage constructs, as noted) in the new backup operation are fingerprinted (e.g., using fingerprint generation module 250) and looked up within fingerprints from the last full backup operation (e.g., fingerprints 215(1)-(N) in fingerprint cache 240).

If a given fingerprint is not among fingerprints 215(1)-(N) in fingerprint cache 240, a "cache miss" has occurred, and such as indicated (thereby indicating that one or more fingerprints thus generated were not present in the last full backup operation). That being the case, such fingerprints are looked up in a fingerprint index cache, which, in certain embodiments, is a centralized fingerprint index cache such as that depicted in connection with FIG. 2B. In certain embodiments, if the fingerprints are not found in such a central fingerprint index cache, the fingerprints are inserted into the central fingerprint index cache. Future backup operations can then reference fingerprints from both the last full backup operation (e.g., an initial backup operation) and the new backup operation.

In some embodiments, such a central fingerprint index cache is maintained by a deduplication server. In such a scenario, the central fingerprint index cache contains at least part of the entire set of fingerprints that exist in the deduplication system and contains fingerprints generated by a fingerprinting algorithm such as that described previously herein. Although future backup operations can reference fingerprints from the previous backup operations, the central fingerprint index cache will typically not maintain copies of all the fingerprints making up fingerprints 215(1)-(N) because, in this example, fingerprint cache 240 is implemented on an SSD. While such an implementation provides faster fingerprint retrieval and lookup functions, such a storage technology does not typically provide enough storage to store all the fingerprints associated with the various data segments in the previous backups. Therefore, index file 290 is needed, to ensure that future backup operations can reference index file 290 (rather than having to store all such fingerprints in fingerprint cache 240).

FIG. 3B is a simplified block diagram illustrating an example of the composition of index file 290 and data file 285, according to one or more embodiments. That being the case, index file 290 can be seen to contain: <FP1, size1, offset1>, <FP2, size2, offset2>, and so on, where FP1 represents fingerprint 211(1), FP2 represents fingerprint 211(2), and so on. As is shown in FIG. 3B, the size and offset information, associated with each of the fingerprints, serves as an index to a data segment in data file 285 to which the given fingerprint corresponds.

In some embodiments, index file 290 includes a number of data object records, each of which may include, in addition to the foregoing, a unique identifier (UID) list, which may list one or more UIDs of file records in catalog 295, as described subsequently in connection with FIG. 4. When a file's data is to be inserted in the catalog (e.g., as part of a backup operation), a file record is created with a UID for the file and fingerprint for the data of the file. In such embodiments, the given UID can be inserted into the data object record that has the data fingerprint in question (i.e., the fingerprint of the data object storing some or all of the file data of the inserted file). When a file record is removed (e.g., in response to a request from a source computer), the UID of that file record is also removed from the corresponding data object record. Thus, in such embodiments, the UID list of a data object record uniquely identifies each file to which file data corresponds.

Figure 3C:
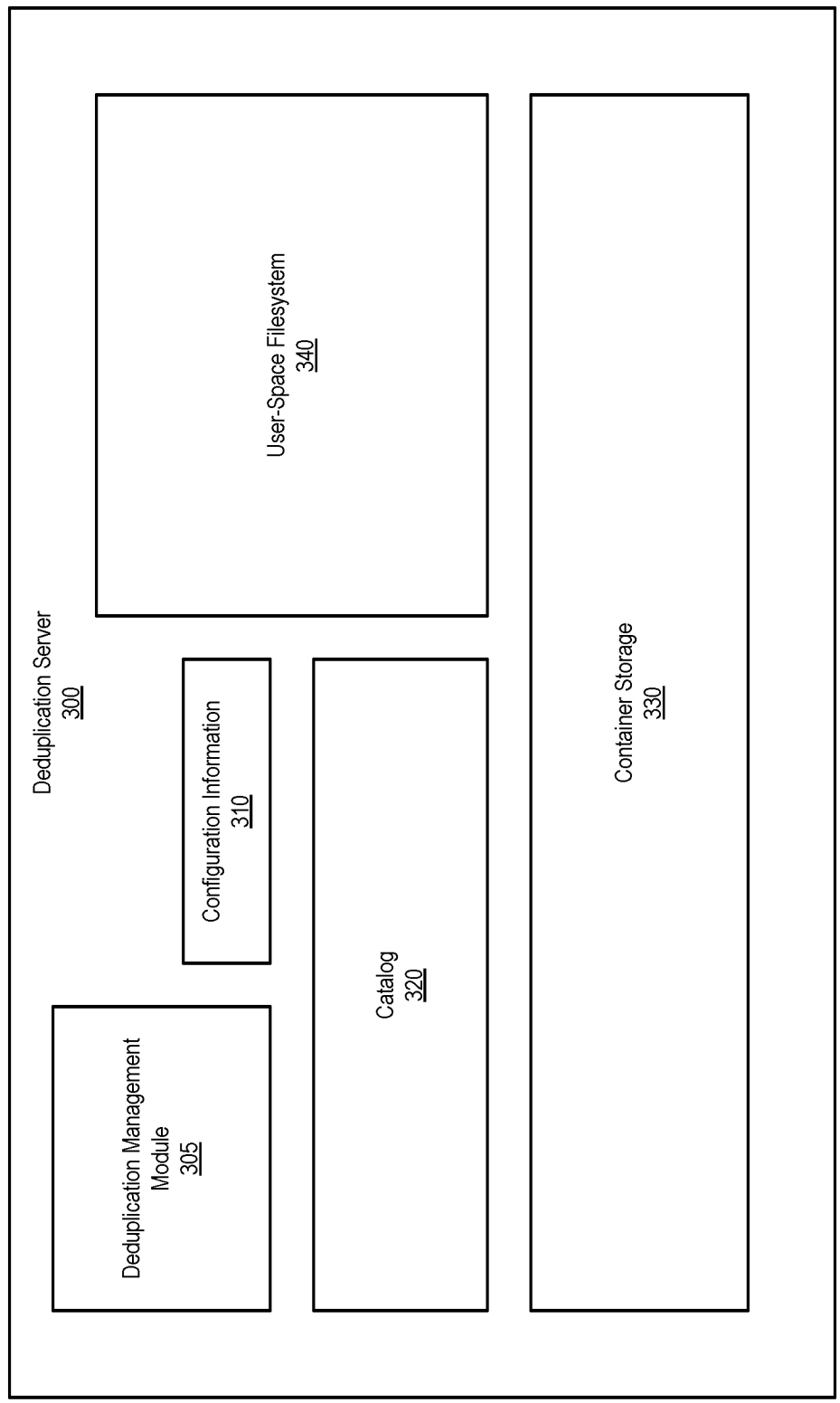
FIG. 3C is a simplified block diagram illustrating an example of a deduplication system, according to embodiments of methods and systems such as those disclosed herein.

FIG. 3C is a simplified block diagram illustrating an example of a deduplication system that provides a user-accessible storage area, according to methods and systems such as those described herein. That being the case, FIG. 3C depicts one embodiment of a deduplication server 300, in the manner of deduplication server 140 of FIG. 1. Deduplication server 300 includes a deduplication management module 305 (e.g., in the manner of deduplication management module 297, described earlier in connection with FIG. 2B), which manages and maintains a variety of information, including, in the depicted embodiment, configuration information 310, catalog information 320 (in the manner of catalog 295 described previously), and container storage 330 (in the manner of containers 280 described previously). In the embodiment depicted in FIG. 3C, deduplication server 300 also supports a user-space file system 340. Despite existing in the storage of deduplication server 300, user-space file system 340 can be accessed from other computing systems (e.g., client systems 110), by users of such other computing systems, in the manner of file systems local to those computing systems. Such can be accomplished using, for example, protocols such as NETWORK FILE SYSTEM (NFS), SERVER MESSAGE BLOCK (SMB), COMMON INTERNET FILE SYSTEM (CIFS), or the like. For example, a directory in user-space file system 340 can be mounted in a file system of one or more of client systems 110, and so allow users of those client systems two access information in user-space file system 340, which allows files being written into the file system to be deduplicated. However, as noted elsewhere herein, users often take advantage of such shared access in ways that present the challenges described earlier herein, including changes to content, naming, location, and the like. That being the case, the structure of deduplication server 300 is presented as another example of a configuration that can suffer from such issues, and so experience inefficiencies caused by significant numbers of references and alteration to the data storage constructs represented thereby.

Figure 4:
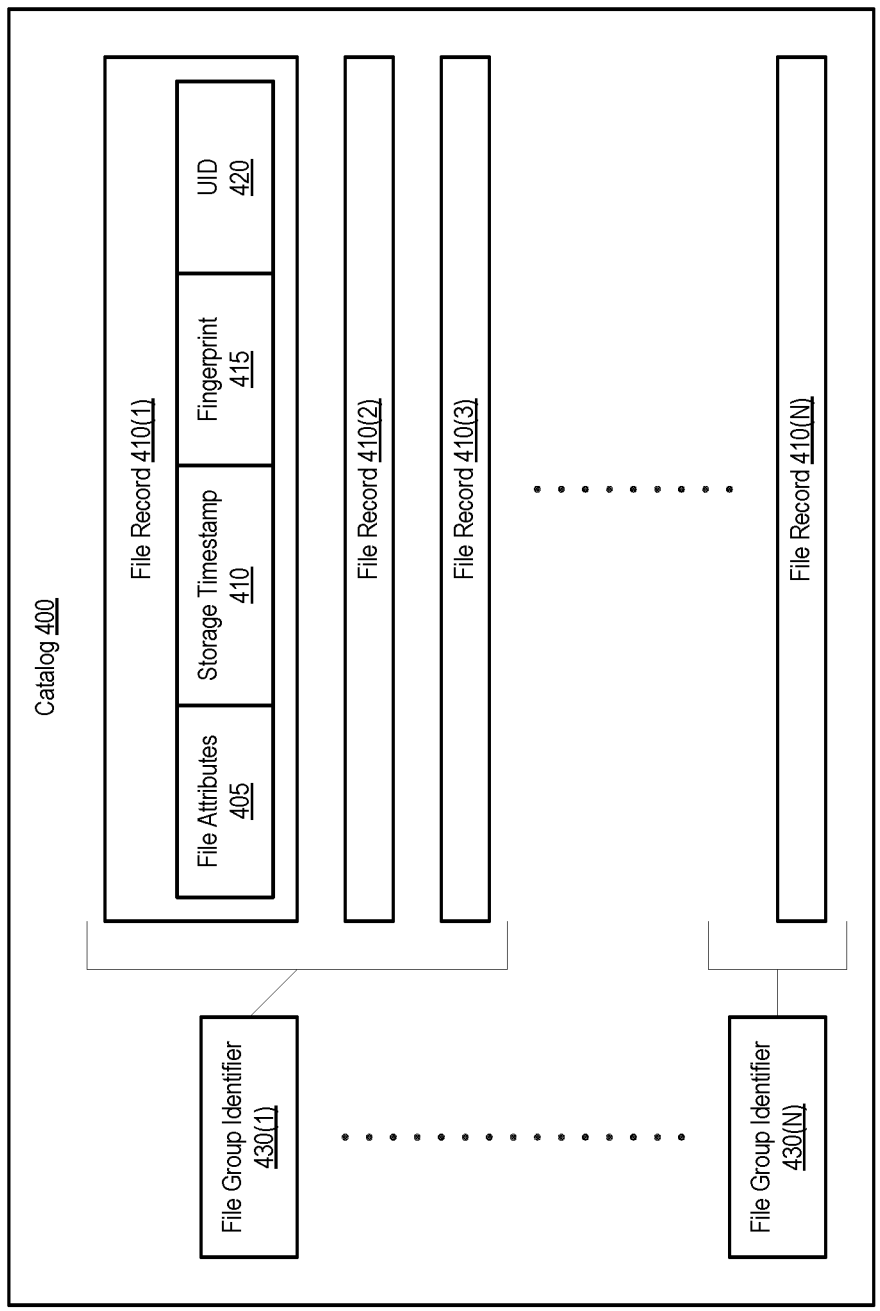
FIG. 4 is a simplified block diagram illustrating an example of a file record, according to embodiments of methods and systems such as those disclosed herein.

FIG. 4 is a simplified block diagram illustrating an example of a catalog, according to embodiments of methods and systems such as those disclosed herein. According to the illustrated embodiment, one or more file records can be stored in a catalog such as catalog 295 (a comparable construct being illustrated in FIG. 4 as a catalog 400), and is illustrated in FIG. 4 as being among a number of such file records (depicted in FIG. 4 as file records 410(1)-(N), or in their entirety, as file records 410). Using file record 410(1) as an example, it can be seen that FIG. 4 depicts file record 410(1) as including one or more file attributes 405, a storage timestamp 410, a fingerprint 415, and a unique identifier (UID) 420. In various embodiments, a file record may include fewer and/or additional details and/or various other pieces of information.

In certain embodiments, file attributes 405 includes a number of attributes of the corresponding file (e.g., filename, path, size, owner, modification/access history, permissions, and so on, as relates to the file in question). Storage timestamp 410 may include an indication of when the file record was created or last updated, for example. In certain embodiments, data fingerprint 415 contains fingerprint information that effectively uniquely identifies the data in the corresponding file, such that two files with the same data portion will have the same data fingerprint and two files with different data portions will have different fingerprints. For example, the data fingerprint may be derived by applying one or more hash functions to the data portion of the corresponding file, as noted earlier. Various other methods for calculating data fingerprints can be used to calculate data fingerprints, as also noted earlier. According to the illustrated embodiment, file record 410(1) also includes unique identifier (UID) 420 for the corresponding file. UID 420 may uniquely identify the file corresponding to file record 410(1) using various techniques, including those described in connection with the generation of fingerprints such as those associated with the data segments described elsewhere herein.

Also depicted in FIG. 4, are a number of file group identifiers (depicted in FIG. 4 as file group identifiers 430(1)-(N), and referred to in the aggregate as file group identifiers 430). File group identifiers 430 can be associated with one or more of file records 410, and so allow such one or more file records to be manipulated being deduplication operations, such as those described elsewhere herein, as a group, rather than individual file records. As will also be appreciated, such file group identifiers can identify groups of files that include any number of files, from a single file, up to a maximum number of files catalog 400 is able to catalog.

In certain embodiments, catalog 400 includes a path object (PO, as noted) corresponding to each data object group in the catalog. The data object group's path object includes a data object group path (the location at which the data object group content can be found), as well as a fingerprint for the data object group and the CID of the container storing the fingerprint list for the data object group. As will be described in further detail subsequently, deletion of a data object group causes the corresponding path object to be removed, as well as the deletion of the data object's fingerprint from the corresponding segment object fingerprint lists.

Figure 5:
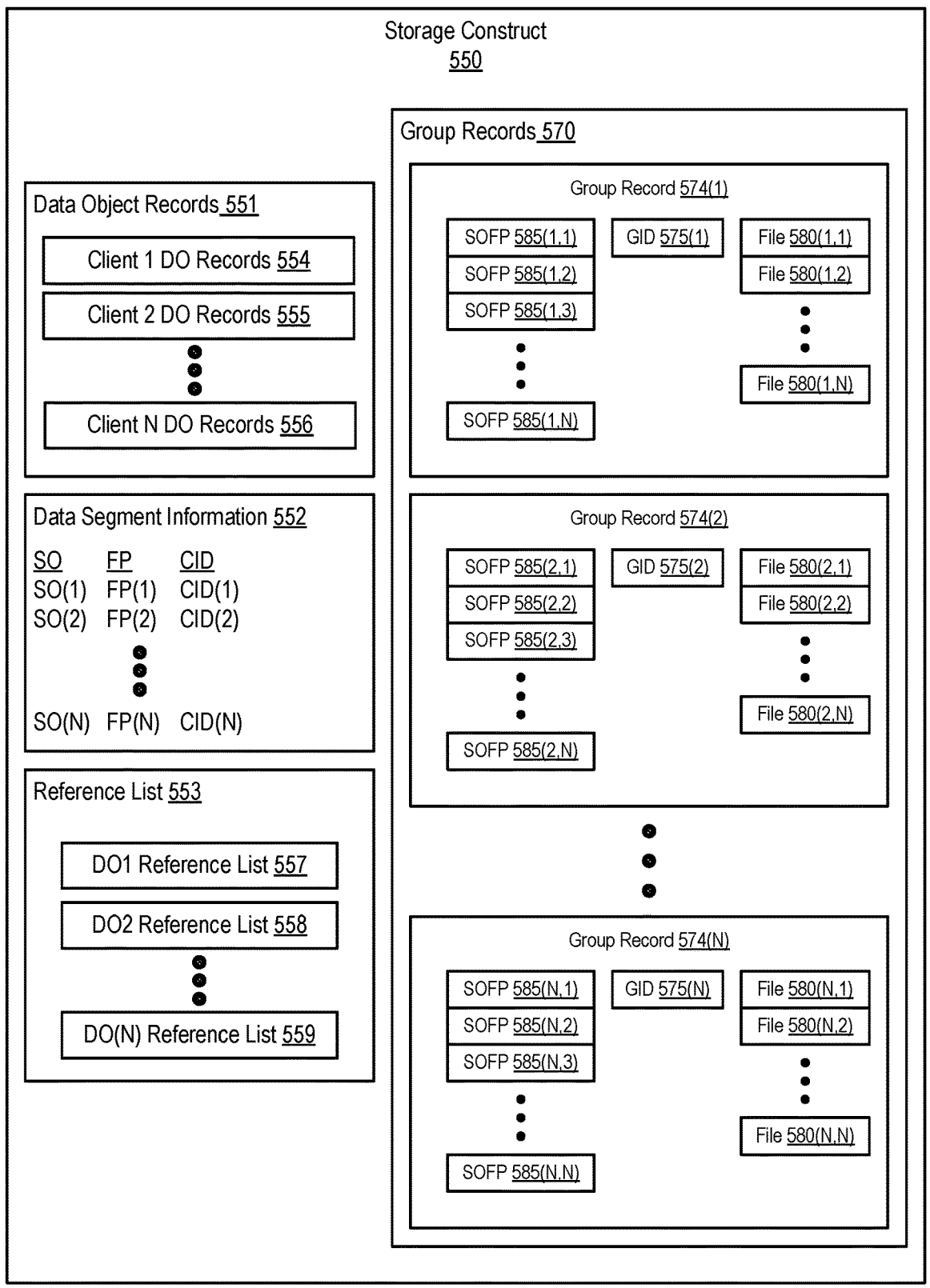
FIG. 5 is a simplified block diagram illustrating an example of a storage construct employed by a deduplication server, according to methods and systems such as those described herein.

FIG. 5 is a simplified block diagram illustrating an example of a storage construct employed by a deduplication server, according to methods and systems such as those described herein. Such a storage construct (depicted in FIG. 5 as a storage construct 550) includes one or more data object records (data object records 551), data segment information (data segment information 552), and a set of reference lists (reference lists 553).

In the embodiment depicted in FIG. 5, data object records 551 include data object records for each client system. Thus, as shown, storage construct 550 includes data object records for Client 1, 2, . . . , N, illustrated as Client 1 DO records 554, Client 2 DO records 555, . . . , Client N DO records 556. Such data object records reflect the data object records for each individual client system. Thus, in the depicted embodiment, storage construct 550 includes data object records of the full and incremental backups performed on each respective client system. Such data object records can contain, for example, a list of data objects. Data objects can be data constructs, or can be used to describe different backups performed on a client system. For example, a data object can exist for each full backup performed with respect to the data of a given client system and for each incremental backup of such data performed.

Data object content can be an ordered list of fingerprints for the data segments of the data object. The data object fingerprint is a fingerprint value generated from the data object content. This fingerprint value may be calculated, for example, by taking the binary concatenation of the ordered segment fingerprint values (for the individual segments represented by the data object), and hashing that concatenation. The resulting hash value can then be used as the data object fingerprint. Also included, in certain embodiments, in such a data object record is a container identifier, which identifies the container in which the data object is stored.

Data segment information 552 includes fingerprint information for each individual data segment, including the data segment's fingerprint (depicted in FIG. 5 as fingerprints FP(1)-FP(N)) and the identifier of the container that stores the data segment in question (depicted in FIG. 5 as container identifiers CID(1)-CID(N)). As shown, then, data segment information 552 includes a list of data segments 1, 2, . . . , N as SO1, SO2, . . . , SO(N), the corresponding fingerprint values (FP(1)-FP(N)), and container identifiers (CID(1)-CID(N)) for each data segment. Typically, the list of data segments within data segment information 552 includes all data segments used at any one of the client systems. Such data segment information can be used to maintain fingerprint information for individual data segments. These fingerprint values can be calculated in a number of different ways. For example, fingerprint values can be calculated by way of a hashing algorithm that takes as its input the contents of a given data segment, in order to produce a fingerprint corresponding to that data segment. As shown, data segment information 552 includes a list of data segments, with the entry for each data segment including the data segment's fingerprint value and the container identifier of the container that stores the data segment.

Reference lists 553 includes individual reference lists for each data segment, by data object fingerprint. As shown, reference lists 553 includes a reference list for data objects 1, 2, . . . , N as DO1 reference list 557, DO2 reference list 558, . . . , DO(N) reference list 559. Reference lists 553 are used to track data segments that are referenced by data objects, and so can be used to list data objects that make reference to a particular data segment. Such a reference list can thus include, for example, a list of data object fingerprints (where the data object makes reference to the segment object, such that the data object content contains the segment object fingerprint), a container identifier (CID; identifying a container file such as container file 280, which stores the data object), and so can be used (e.g., by an I/O manager or the like) to locate and identify one or more containers (e.g., one of container files 280(1)-(N)) stored in a storage device such as storage unit 270.

In one embodiment, reference lists are used to track and identify data objects. These references refer to the various data segments. Whenever a data object is removed (e.g., a file being deleted), the data structures of storage construct 550 can be updated to reflect such deletion (e.g., as by an update to information regarding the data object in the data object group file). In such a case, references to the data object may also be removed from the respective reference lists. Once a data segment reference list is empty, the data segment can then be removed from the corresponding container.

Storage construct 550 is also depicted as including a number of data object group identifiers, which, in the embodiment illustrated in FIG. 5, are stored as part of group records (referred to in the aggregate as group records 570). Group records 570 include a number of group records (depicted in FIG. 5 as group records 574(1)-(N), and referred to in the aggregate as group records 574), each of which are shown as including, among other information regarding each of the groups, a corresponding group identifier (GID) for the data object group in question (depicted in FIG. 5 as group identifiers (GIDs) 575(1)-(N), and referred to in the aggregate as group identifiers 575), some number of files (or comparable data objects; depicted in FIG. 5 as files 580(1,1)-(N,N)), and an identifier for each of the segment objects (depicted in FIG. 5 as segment object fingerprints (SOFPs) 585(1,1)-(N,N)). As will be appreciated in light of the present disclosure, while the data objects in each of group records 570 are depicted in FIG. 5 as files 580(1,1)-(N,N), it will be appreciated that such constructs can also be implemented as some manner of reference to such data objects, references to other structures of storage construct 550 or the like, and/or other such referencing constructs, and that such alternatives are intended to come within the scope of the present disclosure. Moreover, in the embodiment depicted in FIG. 5, it will be appreciated that SOFPs 585(1,1)-(N,N) correspond to the segment object fingerprints of the data objects included in the given group.

In certain embodiments, each data object group is itself treated as a data object. That being the case, each data object group's GID (e.g., GIDs 575(1)-(N)), in certain embodiments, can be based, at least in part, on the segment object fingerprints for the data segments of the data objects belonging to the data object group. For example, a data object group's fingerprint can be formed by generating a hash value of the ordered segment object fingerprints of the files included in the group. By way of further example, a given data object group includes two files, File 1 and File 2. File 1 has two data segments, and File 2 has three data segments. The resulting file group fingerprint could be generated by determining the hash value of the binary concatenation of the fingerprint for data segment 1 of File 1, the fingerprint for data segment 2 of File 1, the fingerprint for data segment 1 of File 2, the fingerprint for data segment 2 of File 2, and the fingerprint for data segment 3 of File 2. Here again, such hashing results in a unique GID, with an acceptable level of confidence.

In terms of data objects that are files, then, group records 570 are group records for files, and so can be referred to as file group records. Similarly, the group identifiers (group identifiers 575) can be referred to as file group identifiers. Such file group identifiers can be included in their respective file group records, along with other information regarding the files in the file group. The file group's content can be stored as a file or other such construct (e.g., as a database). In such embodiments, the deduplication system catalog has a path object (PO, as noted) corresponding to the file group, and the path object contains the file group path (the location at which the file group content can be found), as well as the file group fingerprint and the CID of the container that stores the fingerprint list of the file group. When a file group is removed, the corresponding path object is removed, and the file group fingerprint is removed from the corresponding segment object fingerprint lists.

When a file in a file group is removed or modified, the operation triggers the file group record change leading to the file being marked as removed in the file group record. The modified file will be included in a new file group and the file metadata will contain the new file GID. As will be appreciated in light of the present disclosure, a file in a file group does not have a corresponding data object and does not have a corresponding path object in the deduplication catalog.

As will also be appreciated in light of the present disclosure, an alternative in the use of such file group identifiers allows for such file group identifiers to be associated with the file records maintained on a per-client basis in data object records 551. However, such need not be the case. In fact, such file group identifiers (and, in fact, the file group records of which they are a part) can be implemented in a manner that replaces the respective ones of such file records. Further, in certain embodiments, metadata associated with each data object can be updated to reflect the membership of each such data object, and thus such membership can be reflected in the metadata included a given change tracking stream that reflects a change to the given data object. For example, in the case of data objects that are files, each file's header can be modified to include a file group identifier for the file group in which the given file is a member. As will be appreciated, these and other alternatives will be appreciated by one of skill in the art in light of the present disclosure, and are intended to be comprehended by the present disclosure.

Example Techniques for the Management of Data References

As noted previously, data deduplication (or more simply, deduplication) is a process that eliminates redundant copies of data and reduces storage and transfer overhead. Deduplication ensures that only one unique instance of data is retained on a storage device. Redundant data blocks are replaced with a pointer to the unique data copy. Source-based deduplication (also called client-side deduplication) removes redundant blocks before transmitting data to a backup target such as a storage device, and can also provide facilities for determining if such data transfer is needed by checking fingerprints against fingerprints maintained by, for example, a backup server and/or a deduplication server. Performing deduplication at the source can reduce bandwidth and storage use.

As is also noted, deduplication involves linking references to data content. Although each data segment may be referenced by more than one backup image, storage reclamation can remove data segments in appropriate situations, such as if one or more backups associated with the data segments thus referenced have expired. For example, free space in the given data containers can be compacted to reclaim storage space recently made available, for example, as a result of the deletion of one or more backups resulting from the given backups having expired. Unfortunately, as noted, large numbers of data objects (e.g., files) can lead to large numbers of references, and so, performance issues such as those described elsewhere herein can also result from such compaction.

In light of the aforementioned issues caused by the large number of references that result from a large number of data objects, methods and systems such as those described herein employ the grouping of such data objects into data object groups. Implementations employing such data object groups reduce the number of references needed by grouping data objects into data object groups that are each referenced by a data object group reference (rather than the data object references for each of the data objects in the data object group). As will be appreciated in light of the present disclosure, such an approach reduces the number of references needed, while supporting the requisite deduplication operations.

In one embodiment, then, each such data object group is identified by a data object group identifier. For example, in the case in which the data object is a file, each such data object group represents a file group, where the files in the file group are listed in a file list stored in a file (having as its file name the group number that serves as the file group identifier) in a filesystem directory (in certain embodiments, the directory name can be the integer product of the group number divided by 1024). In one example, to groups (with group identifiers 1 and 2) will be stored into subfolder 0 as file 1.grp and 2.grp. In an implementation in which a deduplication user-space filesystem is implemented, such a group can have a full path relative to the user-space filesystem mount point for a file. In such a scenario, a group counter is maintained, and the counter is incremented when a new group is created and assigned a group number of the current group counter. Such a group counter can be stored as a file, for example.

In light of the foregoing, it will be appreciated that, at a high level, such a data object group can be treated as a file in a directory, and so have its own data object and path object information, as well as corresponding container references. That being the case, the data object of a data object group can have the same format as that of any other data object, except that, in certain implementations, the unique container identifier list includes the unique container identifiers of extent maps from the contained files in the file group, and the fingerprint of a file group (a data object group) is generated based on all fingerprints of its contained files. In this regard, the path object of a data object group, in certain implementations, is the path of the file group, which is used to generate the path object. In such a case, the file representing the given group is treated like a normal file to generate the corresponding path object. Further in this regard, the container references of a data object group, in certain implementations, employ a unique container identifier list for the group, which determines the container reference database to be updated, in the manner of a normal file.

Group operations (more generically referred to herein as deduplication management operations) include operations such as a group create operation, a group update operation, a group deletion operation, and a group merge operation, among other such possibilities. In general terms, methods and systems such as those described herein are directed to the grouping of data objects such as files. To facilitate deduplication management operations on such groupings, such methods and systems perform referencing at the data object group level (rather than at the level of individual files (though such approaches do not necessarily exclude such operations, and can, in certain embodiments, in combination therewith)). Such group operations can be described as follows, in terms of a user-space filesystem such as user-space filesystem 340 of FIG. 3C:

Group create operation: During operation of a user-space filesystem checkpoint/snapshot, groups are formed based on the preset thresholds and the files in the user-space filesystem change tracking stream (e.g., a file change tracking list). A corresponding group file is created, with the paths of its contained files as its content. Example processes that include such operations are described in connection with FIGS. 9-11, subsequently. With regard to the creation of a data object group (which, in part, includes the creation of a data object group construct), the group creation operation includes, in certain embodiments, the creation of one or more references to one or more corresponding container reference databases, such that such references are included as part of the data object group construct.

Group update operation: a file may belong to one group at one point in time, and may belong to a different group after the file is updated. When this happens, the content of the initial group is updated to reflect the file is deleted (e.g., by way of the file being set with a deletion flag), and the file header is updated to reflect its new group number. Example processes that include such operations are described in connection with FIG. 12, subsequently. As will be appreciated in light of the present disclosure, such a group update operation leads to updating of one or more data object groups, as well as new data object group creation. In such embodiments, the updating of the data object group being updated does not trigger container reference operations; however, as will be appreciated in light of the present disclosure, any group creation operations triggered thereby can result in one or more container reference operations.

Group deletion operation: when all files in a group have been marked as deleted, the group file is deleted, and a path object deletion for the group file is sent to the deduplication manager (e.g., a deduplication management module such as deduplication management module 305), and will trigger dereference operations for the corresponding container reference database (e.g., reference lists 553 of FIG. 5). Example processes that include such operations are described in connection with FIG. 13, subsequently. With regard to the deletion of a data object group (which, in part, includes the deletion of a data object group construct, as well as deletion of the data object group's constituent data objects (or references thereto)), the group deletion operation includes, in certain embodiments, the deletion of the data object group construct and dereferencing of references to one or more of the containers in which the data object group's data object's data segments are stored.

Group merge operation: Over time, groups may become groups that mostly contain files marked as deleted, but still contain undeleted files (which can be defined, for example, as a threshold utilization level, the utilization level being a measure of the portion of a group's constituent data objects that have been deleted (or not) (e.g., a percentage), an amount of storage space represented by the deleted (or undeleted) data objects, or by some other measure). A group merge operation is performed to collect such undeleted files (without deletion flag set) from those groups, in order to form one or more new groups. Such undeleted files, collected from the one or more existing groups, are marked as deleted in their original group. A group deletion can then be triggered, once the files in the group have been marked as deleted. Such group merging operations can be employed to help limit the number of groups within a user-space filesystem. Example processes that include such operations are described in connection with FIG. 14, subsequently.

With further regard to the group merge operation (and as is described in greater detail in connection with FIG. 14, subsequently), the group merge operation can, in part, be effected by performing one or more group creation operations and one or more group deletion operations. Appreciated in light of the foregoing, such group creation operations and group deletion operations result in the addition of the references of the data object groups created, and deletion of the references of the data object groups deleted.

Figure 6:
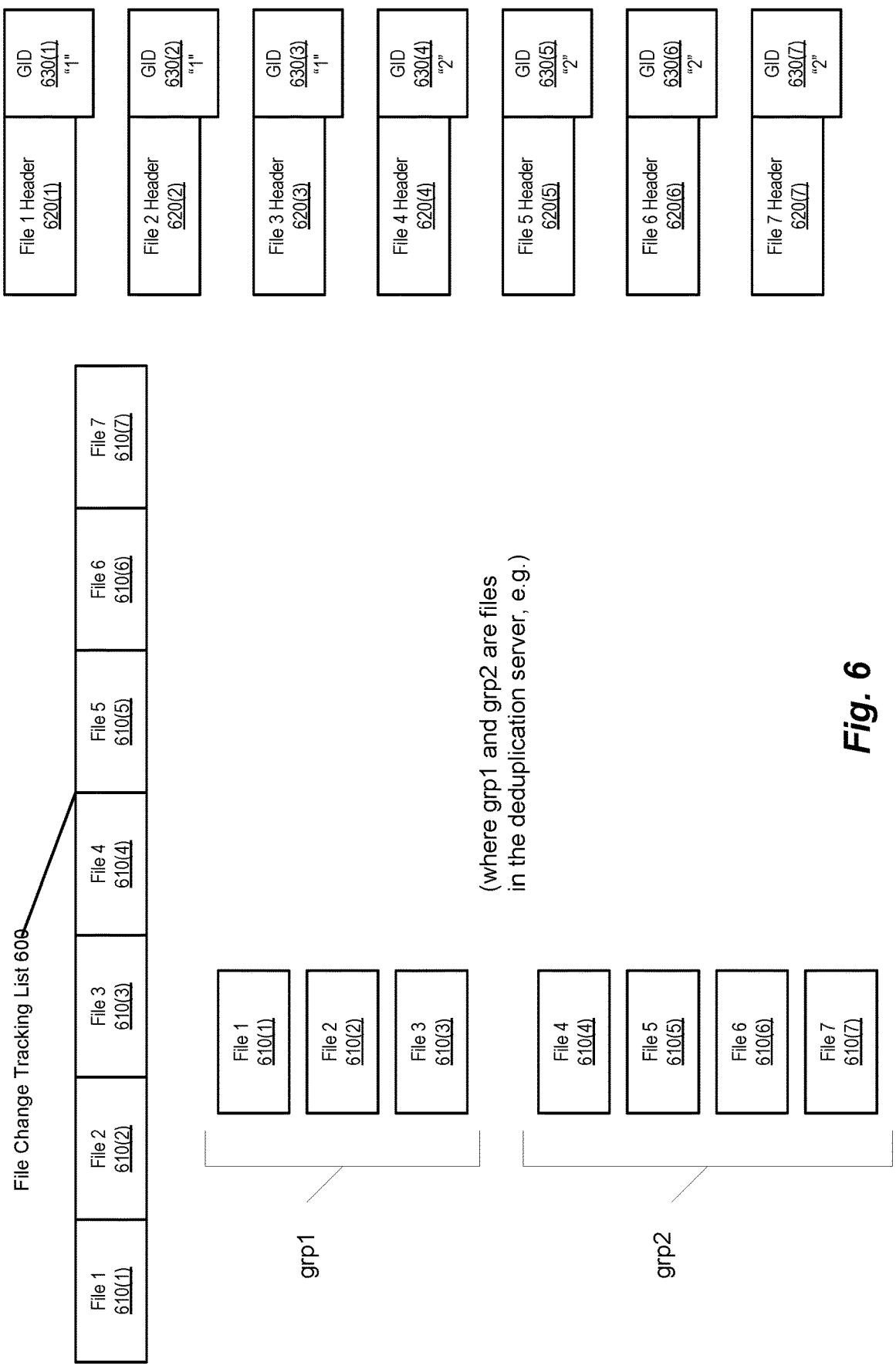
FIG. 6 is a simplified block diagram illustrating an example of the creation of a file group, according to methods and systems such as those described herein.

FIG. 6 is a simplified block diagram illustrating an example of the creation of a file group, according to methods and systems such as those described herein. In the example of FIG. 6, a file change tracking list 600 is received from a client computing system such as one of client computing systems 110 of FIG. 1 (e.g., as might be generated by a change tracker such as change tracker 127). Such a file change tracking list can be generated by a user-space deduplication file system, which may be executed by one or more of client computing systems 110. As depicted in FIG. 6, a file change tracking list 600 includes information indicating that a number of files in the deduplication file system have been changed. That being the case, file change tracking list 600 includes files 1-7 (depicted in FIG. 6 as file information 610(1)-(7), and referred to as file information 610 in the aggregate). As will be appreciated in light of the present disclosure, file information 610 can include some or all of the data of the corresponding file, as well as, for example, metadata regarding the file in question (e.g., including information regarding the file's group membership, as by way of a group identifier (GID), such as that described in greater detail below). By including such metadata (e.g., each file's GID), a deduplication management module, such as deduplication management module 297 of FIG. 2B, is able to identify the group to which each data object (file) belongs, and so treat each of the files represented by file information 610 appropriately. Generally, then, the files included in a given file group can be determined based on the content of the file group's group file. Similarly, a file's membership in a given file group determined from a given group identifier in the file's metadata (e.g., a GID stored in the file's header).

Files 610 are, at least in part, described by corresponding file headers (depicted in FIG. 6 as file headers 620(1)-(7), which are referred to in the aggregate as file headers 620, and more generically, as file metadata, or simply metadata). Included in file headers 620 are storage locations that each contain a group identifier (GID) for the file group in which each file is a member (depicted in FIG. 6 GIDs 630(1)-(7), and referred to in the aggregate as GIDs 630). As can be seen in FIG. 6, files 1-3 are members of group 1 (grp1), while files 4-7 are members of group 2 (grp2). Groups 1 and 2 can be created in the manner noted above, as well as in the manner described in connection with FIG. 9, subsequently. As will also be appreciated in light of the present disclosure, a client-side deduplication management module (e.g., such as client deduplication management module 128 of FIG. 1) can be designed to receive information from a server-side deduplication management module (e.g., such as deduplication management module 297 of FIG. 2B). Such information (referred to herein as deduplication management information (DMI)) can be used to update data object metadata stored by the client system (e.g., file headers 620, and particularly, GIDs 630), such that group membership of the data objects stored at the client is properly indicated.

Figure 7:
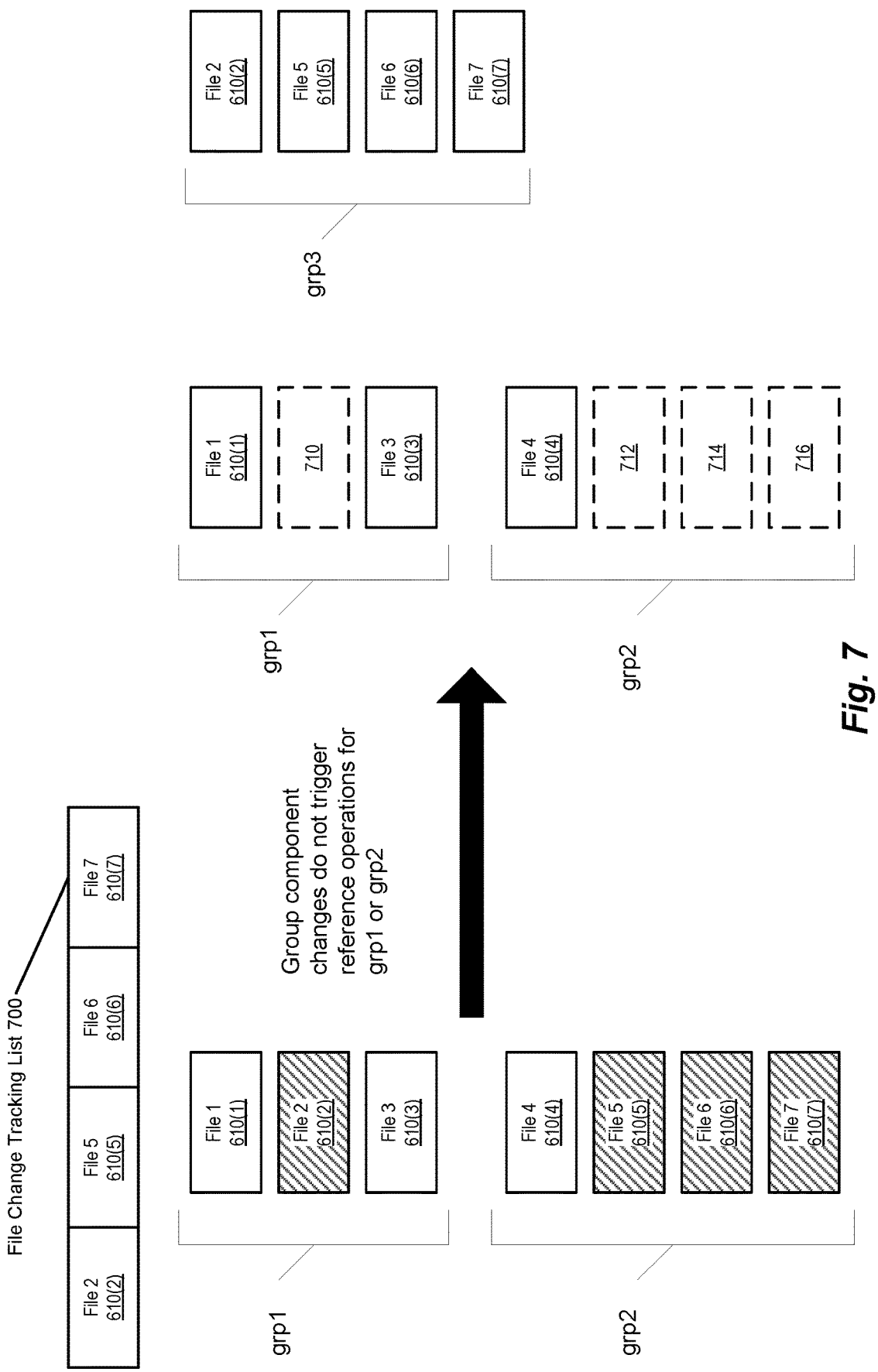
FIG. 7 is a simplified block diagram illustrating an example of updating file groups, according to methods and systems such as those described herein.

FIG. 7 is a simplified block diagram illustrating an example of updating file groups, according to methods and systems such as those described herein. The updating of file groups (also referred to herein as a group update operation) is shown as resulting from the receipt of a file change tracking list 700. In the present example, file change tracking list 700 includes file information 610 for file 2, file 5, file 6, and file 7 (which are depicted in FIG. 7 as file information 610(2), 610(5), 610(6), and 610(7)), indicating that these files have experienced a change in their data, for example. That being the case, file information 610(2), 610(5), 610(6), and 610(7) are marked appropriately (e.g., as by marking them as deleted), and a new group (group 3 (grp3)) is created. Group 3 thus includes file information 610 for file 2, file 5, file 6, and file 7, leaving group 1 with file information 610 for files 1 and 3, and group 2 with file information 610 for file 4. As will be appreciated in light of the present disclosure, group 3 can be formed by updating file information 610(2), 610(5), 610(6), and 610(7), adding those files to group 3, and deleting those files from groups 1 and 2. Alternatively, file information 610(2), 610(5), 610(6), and 610(7) can simply be deleted from the respective ones of groups 1 and 2, the file information received as part of file change tracking list 700 (file information 610(2), 610(5), 610(6), and 610(7)) can be used to form group 3. Further still, such updating can be accomplished simply by updating the affected data and changing references within the groups.

It will also be appreciated that groups having had files deleted therefrom (e.g., groups 1 and 2, in the present example) can maintain information regarding the deleted files. This is demonstrated by the dashed boxes in FIG. 7, which represent file information (depicted in FIG. 7 as deleted file information 710, 712, 714, and 716) for the deleted files (file information 610(2), 610(5), 610(6), and 610(7), respectively). Thus, as will be appreciated, data object groups can maintain information regarding data objects that had been members of the group after their deletion from the group.

Figure 8:
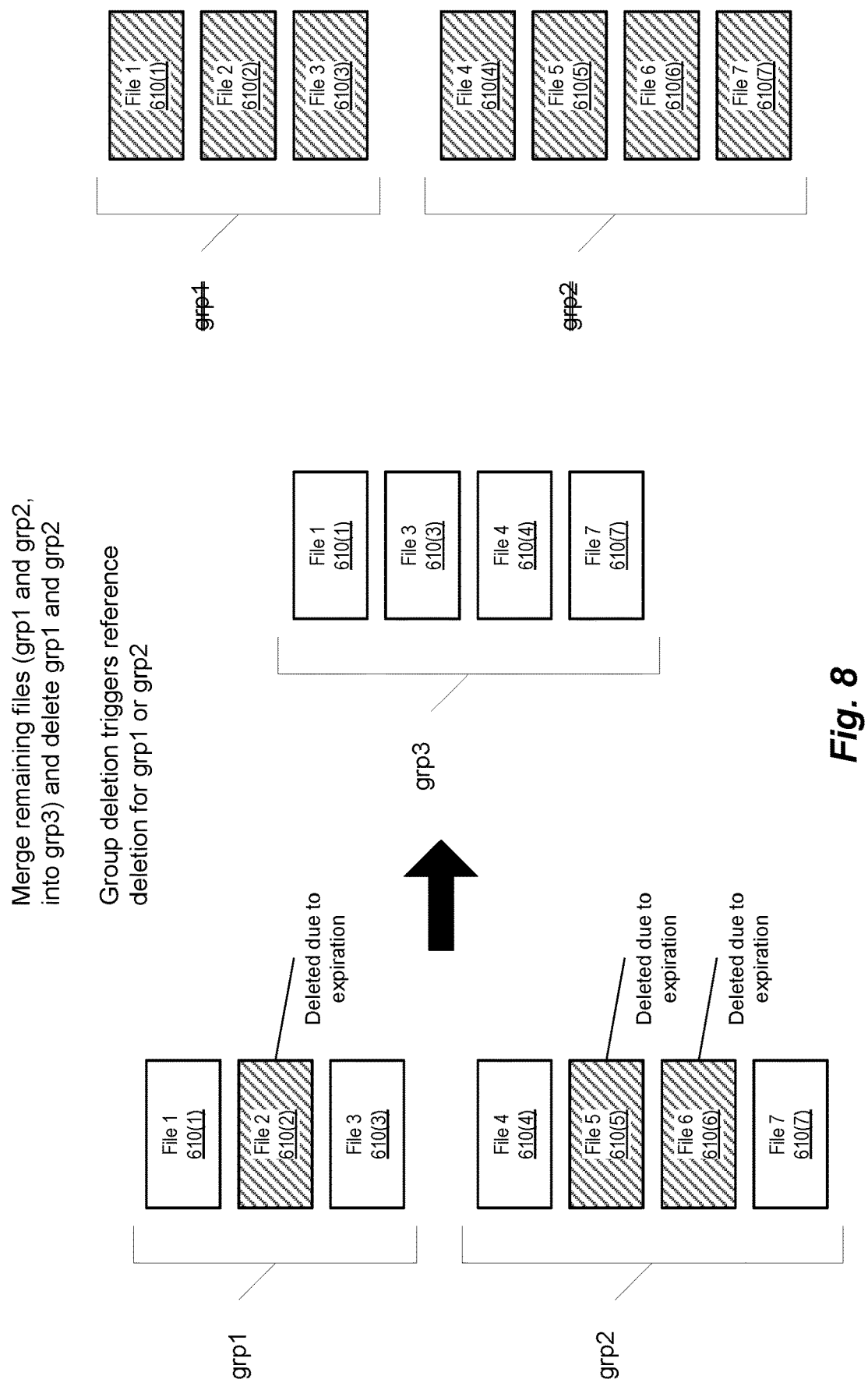
FIG. 8 is a simplified block diagram illustrating an example of merging file groups, according to methods and systems such as those described herein.

FIG. 8 is a simplified block diagram illustrating an example of merging file groups, according to methods and systems such as those described herein. The merging file groups (also referred to herein as a group merge operation) is shown in FIG. 8 as resulting from a situation in which certain of the files in the file groups depicted have been deleted (e.g., as a result of the expiration of a backup image, for example). As will be appreciated, other scenarios resulting in partially-empty groups (or even mostly-empty groups) can also result from other events, including, for example, the deletion of the original file. That being the case, as is depicted in FIG. 8, file information 610(2) for file 2, file information 610(5) for file 5, and file information 610 for file 6 indicate that files 2, 5, and 6 have been deleted due to expiration, leaving groups 1 and 2 as partially-filled groups. In order to address such situations, groups 1 and 2 can be merged into a single group (here, group 3), and the original groups (groups 1 and 2) deleted. As noted with regard to FIG. 7, file information for the various files in group 3 can be grouped by copying the requisite file information from the original groups, or similar effect achieved by changing references thereto. To delete the file information remaining in the original groups, references to the original groups can simply be deleted.

Figure 9:
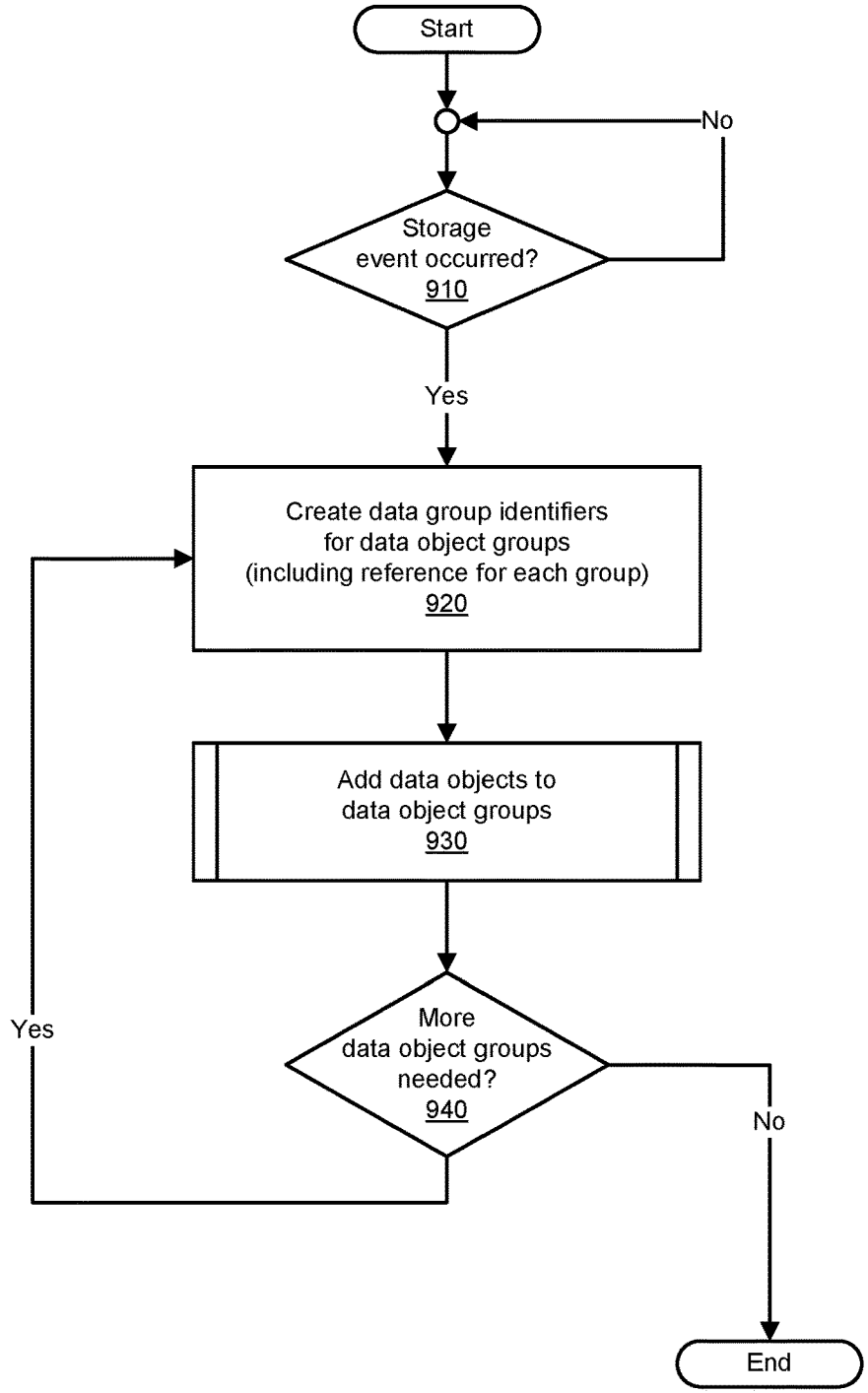
FIG. 9 is a flow diagram illustrating an example of a group creation process, according to embodiments of methods and systems such as those disclosed herein.

FIG. 9 is a flow diagram illustrating an example of a group creation process, according to embodiments of methods and systems such as those disclosed herein. That being the case, a group creation process 900 is depicted group creation process 900 begins with a determination as to the occurrence of an event such as a storage event (910). If no such event has occurred, group creation process 900 iterates, awaiting the occurrence of such an event.

If such an event has occurred, one or more data group identifiers are created for the data object groups into which the data objects will be grouped (920). In certain embodiments, such an operation includes the creation of a reference for each of the data object groups. Next, a process for the addition of data objects to the data object groups is performed (930). An example of such a data object addition process is described in connection with FIG. 10, subsequently. A determination is then made as to whether additional data object groups need to be created (940). If additional data object groups are to be created, group creation process 900 loops to the creation of additional data group identifiers for the data object groups (920). Group creation process 900 continues in this fashion until such time as the requisite data object groups have been created, at which point group creation process 900 concludes.

Figure 10:
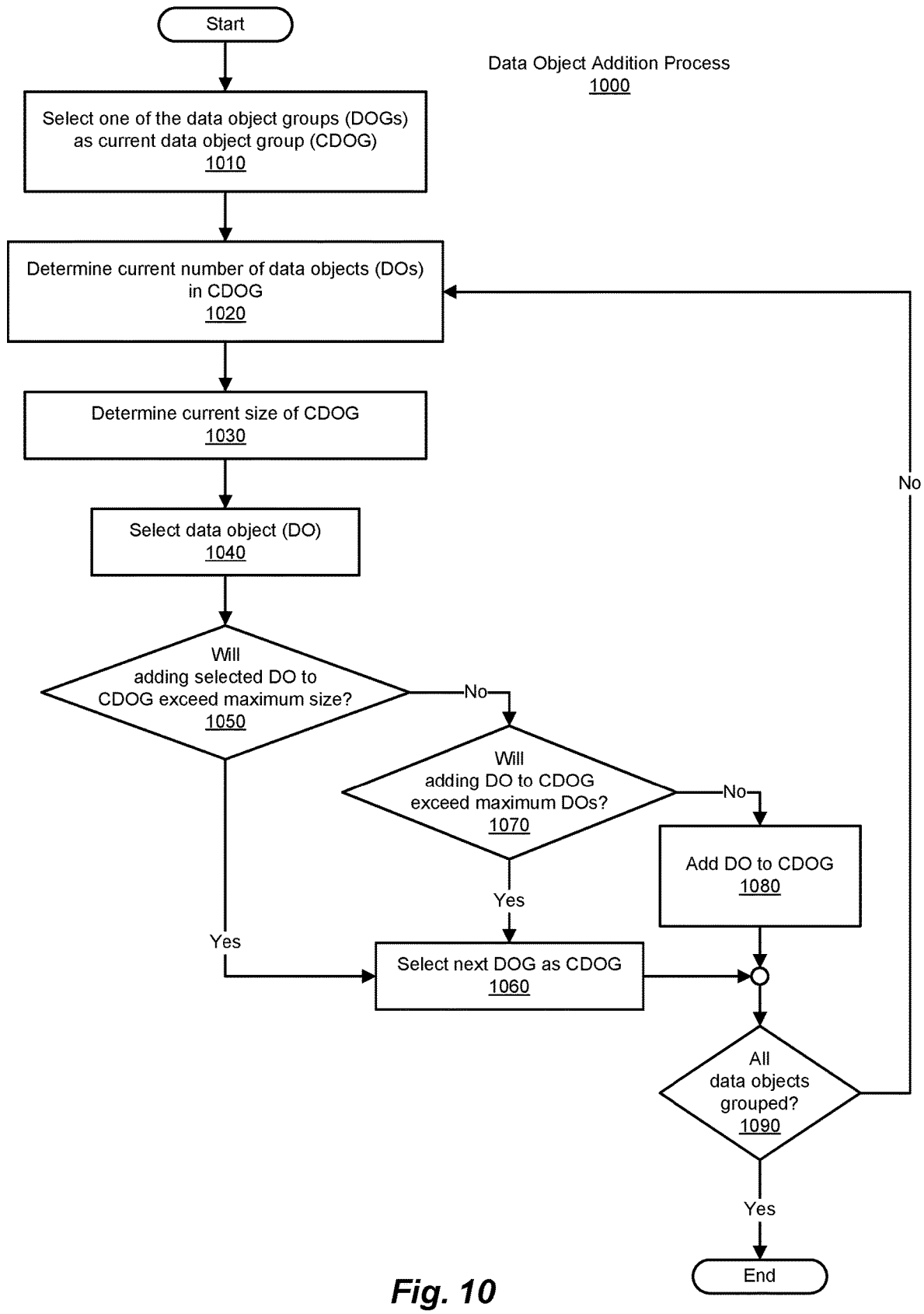
FIG. 10 is a flow diagram illustrating an example of a data object addition process, according to embodiments of methods and systems such as those disclosed herein.
Figure 11:
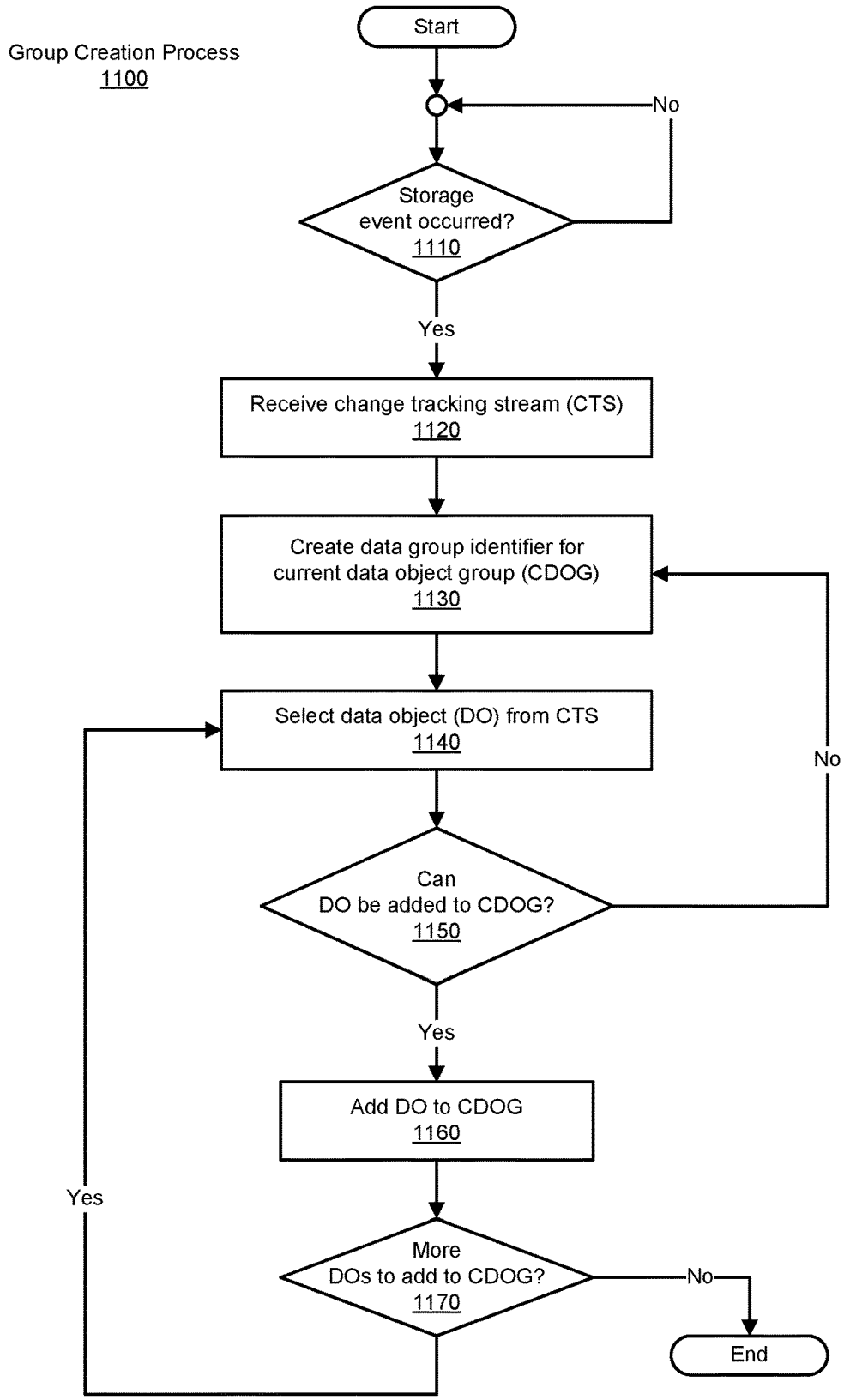
FIG. 11 is a flow diagram illustrating an example of another embodiment of a group creation process, according to embodiments of methods and systems such as those disclosed herein.

FIG. 10 is a flow diagram illustrating an example of a data object addition process, according to embodiments of methods and systems such as those disclosed herein. That being the case, FIG. 11 depicts an example of a data object addition process 1000. Data object addition process 1000 begins with the selection of one of the given data object groups (DOGs) as the current data object group (CDOG) (1010). Next, the number of data objects currently in the current data object group is determined (1020). Also determined is the current size (in terms of storage space consumed by the data objects of the CDOG) (1030). Next, a data object is selected for addition to the current data object group (1040).

At this juncture a determination is made as to whether the addition of the selected data object to the current data object group will cause the current data object group to exceed a maximum storage space threshold (size) (1050). If the addition of the selected data object will not cause the amount of storage consumed by the current data object group to exceed the maximum storage space threshold in question, a determination is made as to whether the addition of the selected data object will cause the number of data objects represented by the current data object group to exceed a maximum number of data objects threshold (1070). As can be seen in FIG. 10, if the addition of the selected data object to the current data object group will cause the current data object group to exceed one or both of the maximum storage space threshold or the maximum number of data objects threshold, another data object group is selected as the current data object group (1060). However, if neither of the aforementioned thresholds will be exceeded by the addition of the selected data object to the current data object group, the data object is added to the current data object group (1080). Such an operation can, in certain embodiments, include the addition of a reference, if a reference is used rather than the data object itself. In either case, a determination is then made as to whether all of the data objects needing to be added to the given data object groups have been thus added (1090). In the case in which further data objects remain to be grouped, data object addition process 1000 proceeds with making the aforementioned determinations (1020 and 1030) with regard to the (now) current data object group, whether that be the original data object group or a newly-selected data object group. Alternatively, if all of the data objects in question have been grouped, data object addition process 1000 concludes.

FIG. 11 is a flow diagram illustrating an example of another embodiment of a group creation process, according to embodiments of methods and systems such as those disclosed herein. That being the case, FIG. 11 depicts a group creation process 1100. As just noted, group creation process 1100 is presented as an example of a group creation process in which data objects such as files are added to one or more groups based on information regarding such data objects having been received as part of a change tracking stream. Group update process 1200 begins with a determination as to whether an event such as a storage event has occurred (1110). Until such time as such an event occurs, group creation process 1100 loops, awaiting such an event. Once such an event occurs (and possibly, as part of the occurrence of such an event), a change tracking stream (CTS) is received (1120). A data group identifier for the current data object group (CDOG) is then created (1130). In certain embodiments, such an operation includes the creation of a reference for the data object group thus created. Next, a data object (DO) is selected from the data objects (or their representative information) in the change tracking stream (1140). A determination is then made as to whether the data object can be added current data object group (1150). Such a determination can be made, for example, in the manner of the operations performed as part of data object addition process 1000. If a determination is made that the data object cannot be added to the current data object group (e.g., due to the size of the current data object group and/or the number of data objects represented thereby), group creation process 1100 loops to the creation of a new data group identifier, and so the inclusion of the selected data object into that data object group (1130, 1140, 1150). If the data object can be added to the current data object group (e.g., the current data object group meets the requisite thresholds, or a new data object group has been created), the data object is added to the current data object group (1160). A determination is then made as to whether additional data objects remain to be added to the current data object group, whether that be the current CDOG or a new CDOG (1170). If further data objects remain to be added to a data object group, group creation process 1100 loops to the selection of the next data object from the change tracking stream (1140), and then proceeds as just described. In the case in which no further data objects remain to be added, group creation process 1100 concludes.

Figure 12:
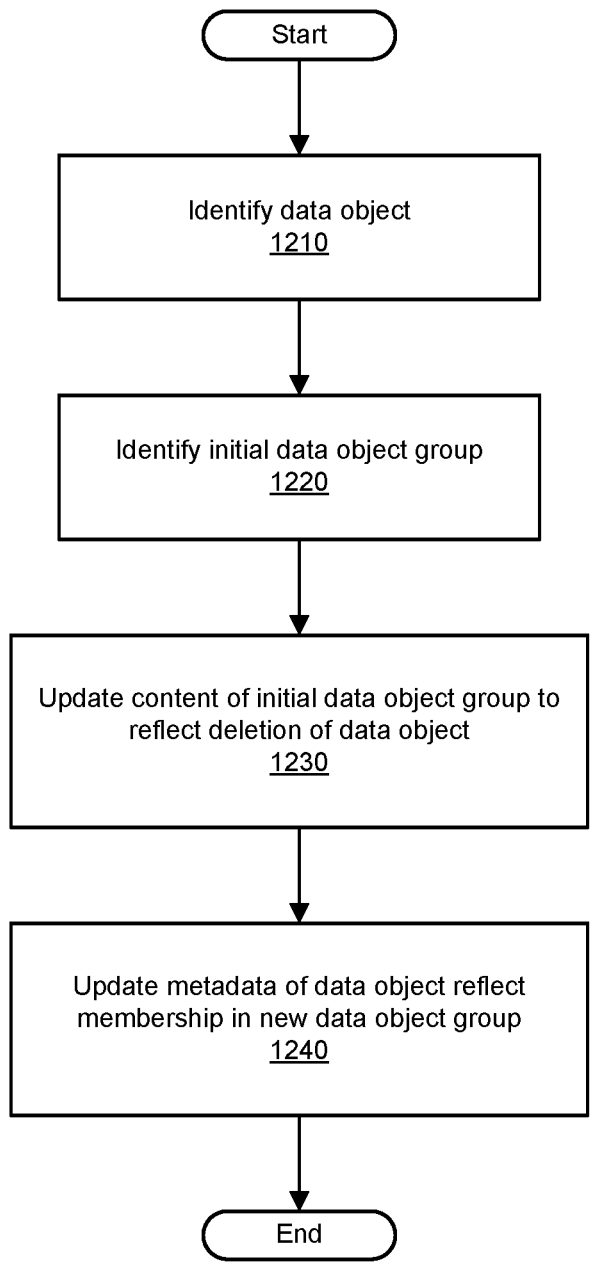
FIG. 12 is a flow diagram illustrating an example of a group update process, according to embodiments of methods and systems such as those disclosed herein.

FIG. 12 is a flow diagram illustrating an example of a group update process, according to embodiments of methods and systems such as those disclosed herein. That being the case, FIG. 12 depicts a group update process 1200. Group update process 1200 begins with the identification of a data object (1210). Next, the initial data object group of the identified data object is identified (1220). Content of the initial data object group is then updated to reflect the deletion of the data object in question (1230). Similarly, the metadata of the data object in question is updated to reflect its membership in a new data object group (1240). Group update process 1200 then concludes. As can be seen in FIG. 12, the updating of the data object group that is subject to group update process 1200 does not trigger container reference operations. That said, however, any group creation operations triggered thereby can result in one or more container reference operations.

Figure 13A:
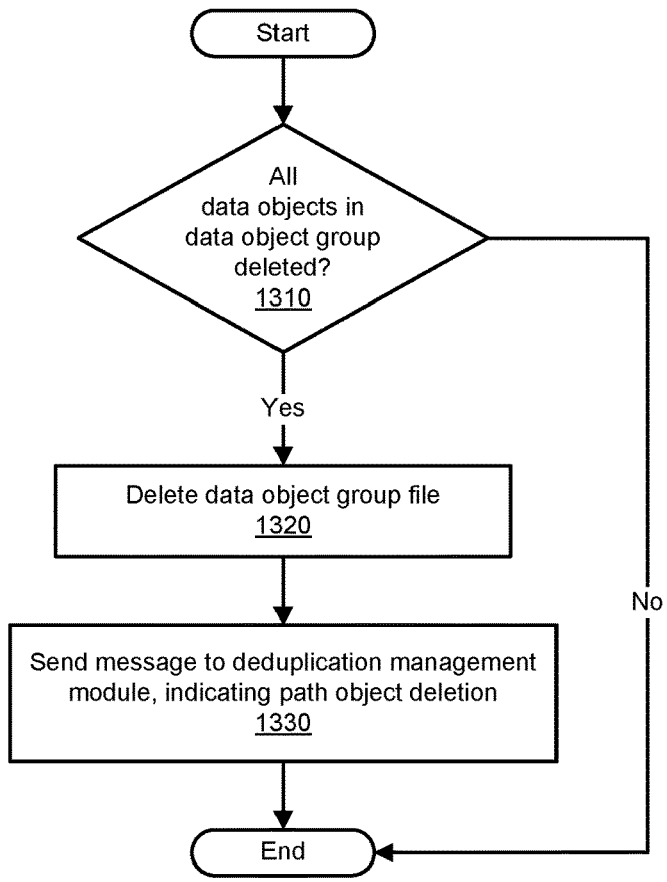
FIG. 13A is a flow diagram illustrating an example of a first portion of a group deletion process, according to embodiments of methods and systems such as those disclosed herein.

FIG. 13A is a flow diagram illustrating an example of a first portion of a group deletion process, according to embodiments of methods and systems such as those disclosed herein. That being the case, FIG. 13A depicts one portion of a group deletion process 1300. In this portion of the process, group deletion process 1300 begins with making a determination as to whether all data objects in the given data object group had been deleted (1310). If one or more data objects remain undeleted in the data object group in question, this portion of group deletion process 1300 concludes. Alternatively, if the data objects of the data object group in question have been deleted, the data object group file can be deleted (1320). A message can then be sent, indicating that path object deletion has been/can be performed (1330). This portion of group deletion process 1300 then concludes.

Figure 13B:
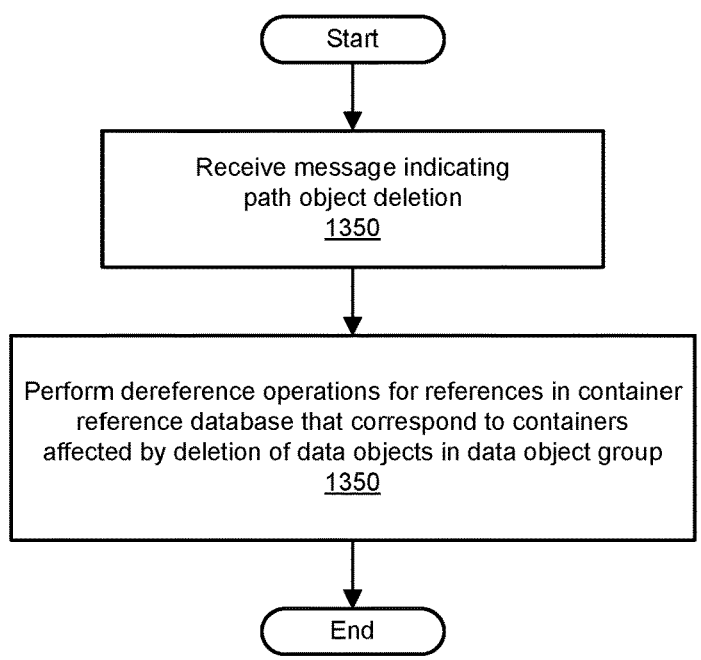
FIG. 13B is a flow diagram illustrating an example of a second portion of a group deletion process, according to embodiments of methods and systems such as those disclosed herein.

FIG. 13B is a flow diagram illustrating an example of a second portion of a group deletion process, according to embodiments of methods and systems such as those disclosed herein. That being the case, FIG. 13B depicts another portion of group deletion process 1300. This second portion of group deletion process 1300 begins with the receipt of the aforementioned message indicating that path object deletion has been/can be performed (1350). Such a message having been received, dereferencing operations can be performed. In one embodiment, such dereferencing operations dereference references in a container reference database (e.g., reference lists 553 of FIG. 5) that correspond to the one or more containers affected by the deletion of the affected data objects that were in the data object group (1350). Such dereferencing operations can be performed, for example, by a deduplication management module such as deduplication management module 145 or deduplication management module 297. The second portion of group deletion process 1300 then concludes.

As noted previously, group deletion process 1300 includes, in certain embodiments, the deletion of the data object group construct and dereferencing of references to one or more of the containers in which the data object group's data object's data segments are stored, as noted with regard to FIG. 13B (which, as also noted, can include, at least in part, the deletion of a data object group construct, as well as deletion of the data object group's constituent data objects (or references thereto)).

Figure 14:
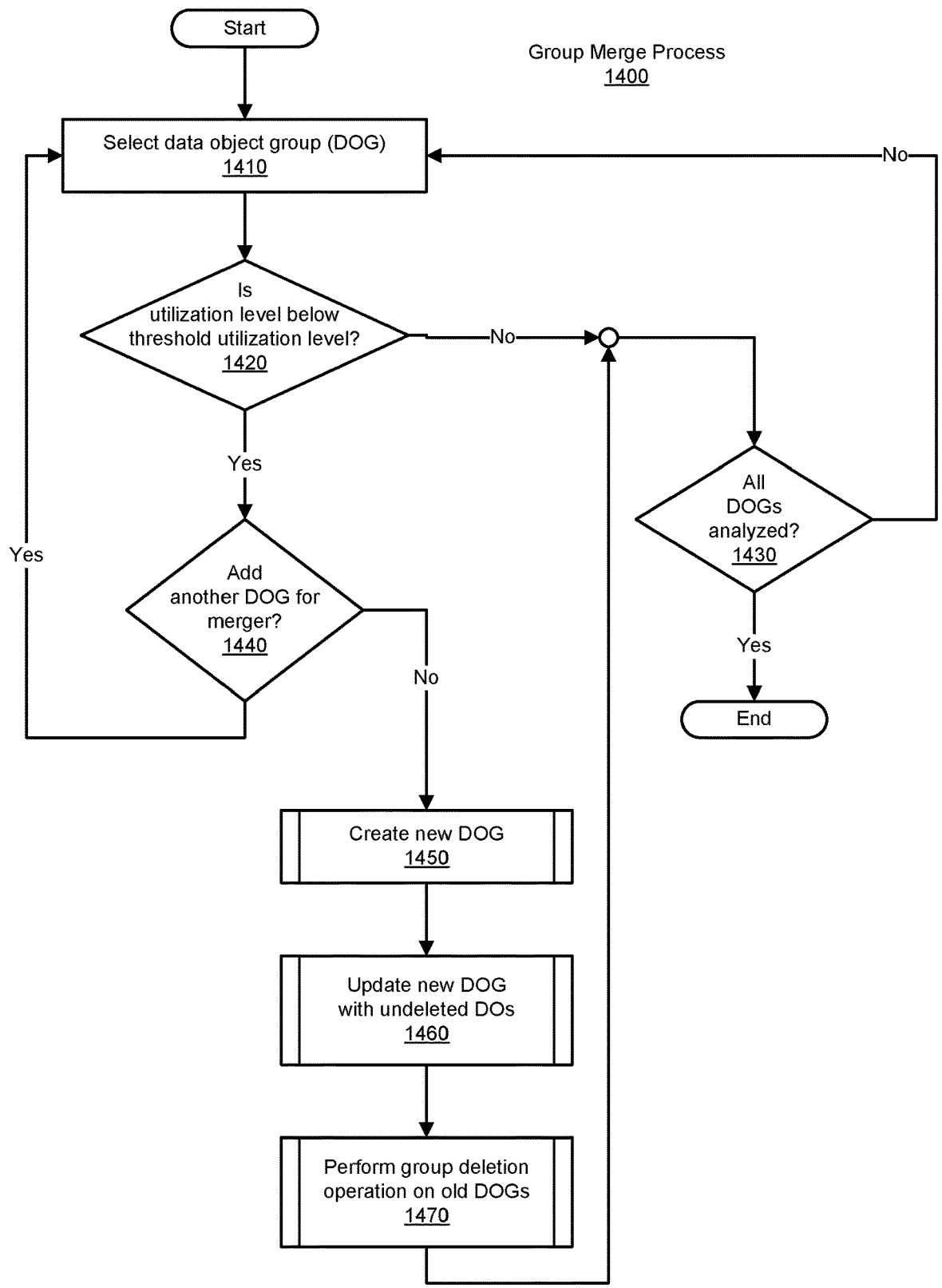
FIG. 14 is a flow diagram illustrating an example of a group merge process, according to embodiments of methods and systems such as those disclosed herein.

FIG. 14 is a flow diagram illustrating an example of a group merge process, according to embodiments of methods and systems such as those disclosed herein. That being the case, FIG. 14 depicts a group merge process 1400. Group merge process 1400 begins with the selection of a data object group (1410). A determination is then made as to whether the utilization level of the data object group selected is below a utilization level threshold (1420). If, for example, the selected data object group exhibits a utilization level that is above the utilization level threshold, a determination is made as to whether the data object groups to be analyzed have all been analyzed (1430). If further data object groups remain to be analyzed, group merge process 1400 proceeds to the selection of the next data object group (1410). Alternatively, if the data object groups have all been analyzed, group merge process 1400 concludes.

If the utilization level of the selected data object group is below the utilization level threshold, group merge process 1400 proceeds with making a determination as to whether another data object group should be included in the group merge operation being performed (1440). If one or more other data object groups are to be included in the group merge operation being performed, group merge process 1400 proceeds with the selection of another data object group (1410), and processes the newly-selected data object group as described above.

Alternatively, if the data object groups to be merged have all been selected, group merge process 1400 proceeds to the creation of a new data object group (1450). Examples of the operations that may be performed in the creation of such a new data object group are discussed in greater detail in connection with group creation process 900 and group creation process 1100, as previously described. Next, the newly-created data object group is updated to include the undeleted data objects from the selected data object groups being merged (1460). An example of such a group update process is given in connection, for example, with the description of group update process 1200. Group merge process 1400 then proceeds with the deletion of the selected data object groups (1470). An example of such a group deletion process is provided in connection with group deletion process 1300. Such a group deletion process can be performed with regard to each of the selected data object groups. As before, a determination is then made as to whether all of the data object groups under consideration for merger have been processed (1430). If further data object groups remain to be analyzed, group merge process 1400 proceeds with the selection of the next set of data object groups to be merged, beginning with a first one of that set (1410). Alternatively, if all the intended data object groups have been analyzed, group merge process 1400 concludes.

As noted earlier, with regard to group merge process 1400, such a group merge operation can, in part, be effected by performing one or more group creation operations and one or more group deletion operations. As will be appreciated in light of the present disclosure, such group creation operations and group deletion operations result in the addition of the references of the data object groups created, and deletion of the references of the data object groups deleted.

An Example Computing and Network Environment

As shown above, the systems described herein can be implemented using a variety of computer systems and networks. Examples of such computing and network environments are described below with reference to FIGS. 15 and 16.

Figure 15:
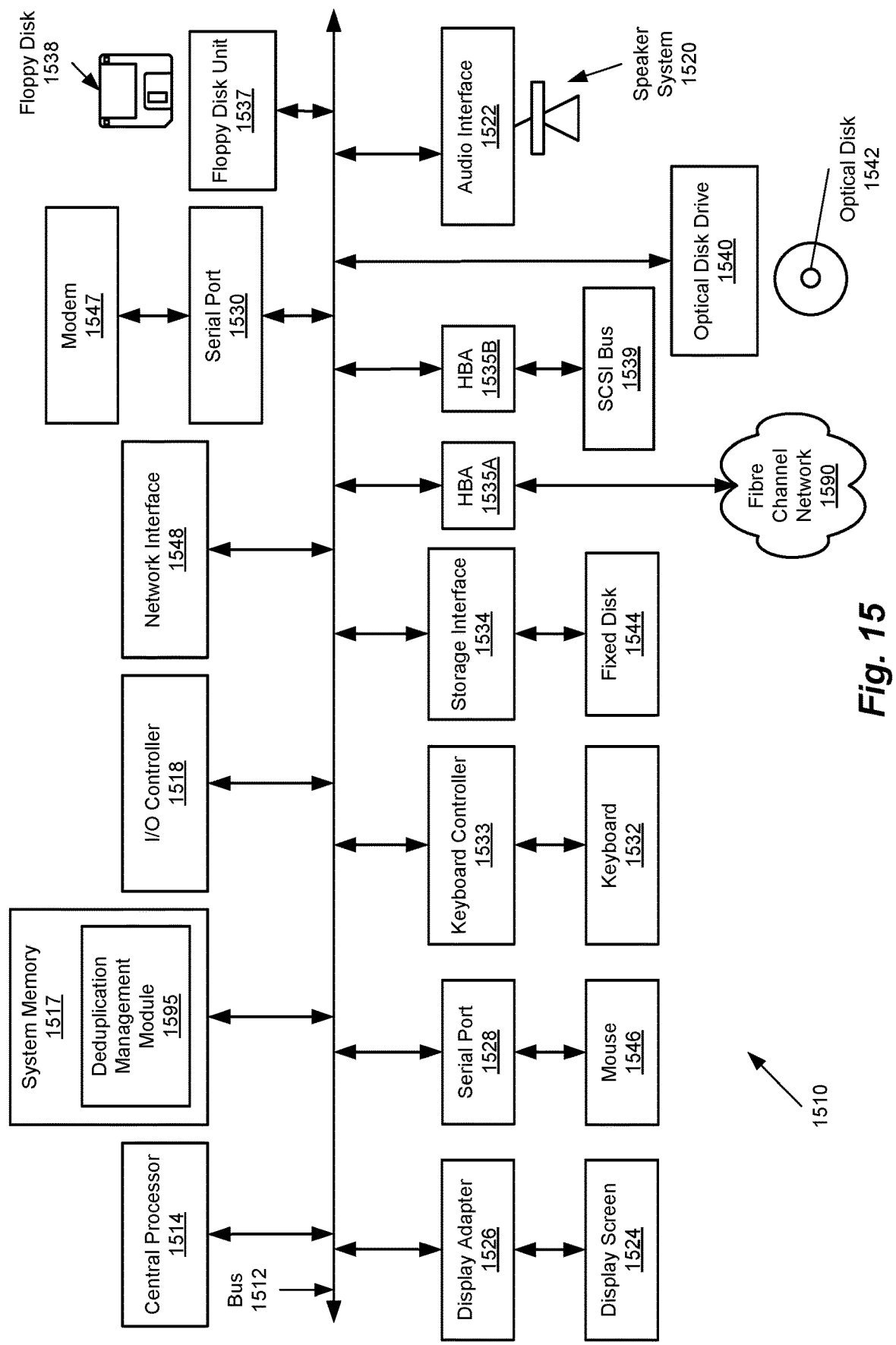
FIG. 15 is a block diagram depicting a computer system suitable for implementing embodiments of methods and systems such as those disclosed herein.

FIG. 15 depicts a block diagram of a computer system 1510 suitable for implementing aspects of the systems described herein. Computer system 1510 includes a bus 1512 which interconnects major subsystems of computer system 1510, such as a central processor 1514, a system memory 1517 (typically RAM, but which may also include ROM, flash RAM, or the like), an input/output controller 1518, an external audio device, such as a speaker system 1520 via an audio output interface 1522, an external device, such as a display screen 1524 via display adapter 1526, serial ports 1528 and 1530, a keyboard 1532 (interfaced with a keyboard controller 1533), a storage interface 1534, a floppy disk drive 1537 operative to receive a floppy disk 1538, a host bus adapter (HBA) interface card 1535A operative to connect with a Fibre Channel network 1590, a host bus adapter (HBA) interface card 1535B operative to connect to a SCSI bus 1539, and an optical disk drive 1540 operative to receive an optical disk 1542. Also included are a mouse 1546 (or other point-and-click device, coupled to bus 1512 via serial port 1528), a modem 1547 (coupled to bus 1512 via serial port 1530), and a network interface 1548 (coupled directly to bus 1512).

Bus 1512 allows data communication between central processor 1514 and system memory 1517, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Applications resident with computer system 1510 are generally stored on and accessed from a computer-readable storage medium, such as a hard disk drive (e.g., fixed disk 1544), an optical drive (e.g., optical drive 1540), a floppy disk unit 1537, or other computer-readable storage medium.

Storage interface 1534, as with the other storage interfaces of computer system 1510, can connect to a standard computer-readable medium for storage and/or retrieval of information, such as a fixed disk drive 1544. Fixed disk drive 1544 may be a part of computer system 1510 or may be separate and accessed through other interface systems. Modem 1547 may provide a direct connection to a remote server via a telephone link or to the Internet via an internet service provider (ISP). Network interface 1548 may provide a direct connection to a remote server via a direct network link to the Internet via a POP (point of presence). Network interface 1548 may provide such connection using wireless techniques, including digital cellular telephone connection, Cellular Digital Packet Data (CDPD) connection, digital satellite data connection or the like. Also depicted as part of computer system 1510 is a deduplication management module 1595, which is resident in system memory 1517 and is comparable in function and operation to the deduplication management modules described earlier herein.

Many other devices or subsystems (not shown) may be connected in a similar manner (e.g., document scanners, digital cameras and so on). Conversely, all of the devices shown in FIG. 15 need not be present to practice the systems described herein. The devices and subsystems can be interconnected in different ways from that shown in FIG. 15. The operation of a computer system such as that shown in FIG. 15 is readily known in the art and is not discussed in detail in this application. Code to implement the modules of the systems described herein can be stored in computer-readable storage media such as one or more of system memory 1517, fixed disk 1544, optical disk 1542, or floppy disk 1538. The operating system provided on computer system 1510 may be MS-DOS, MS-WINDOWS, UNIX, LINUX, or other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 16:
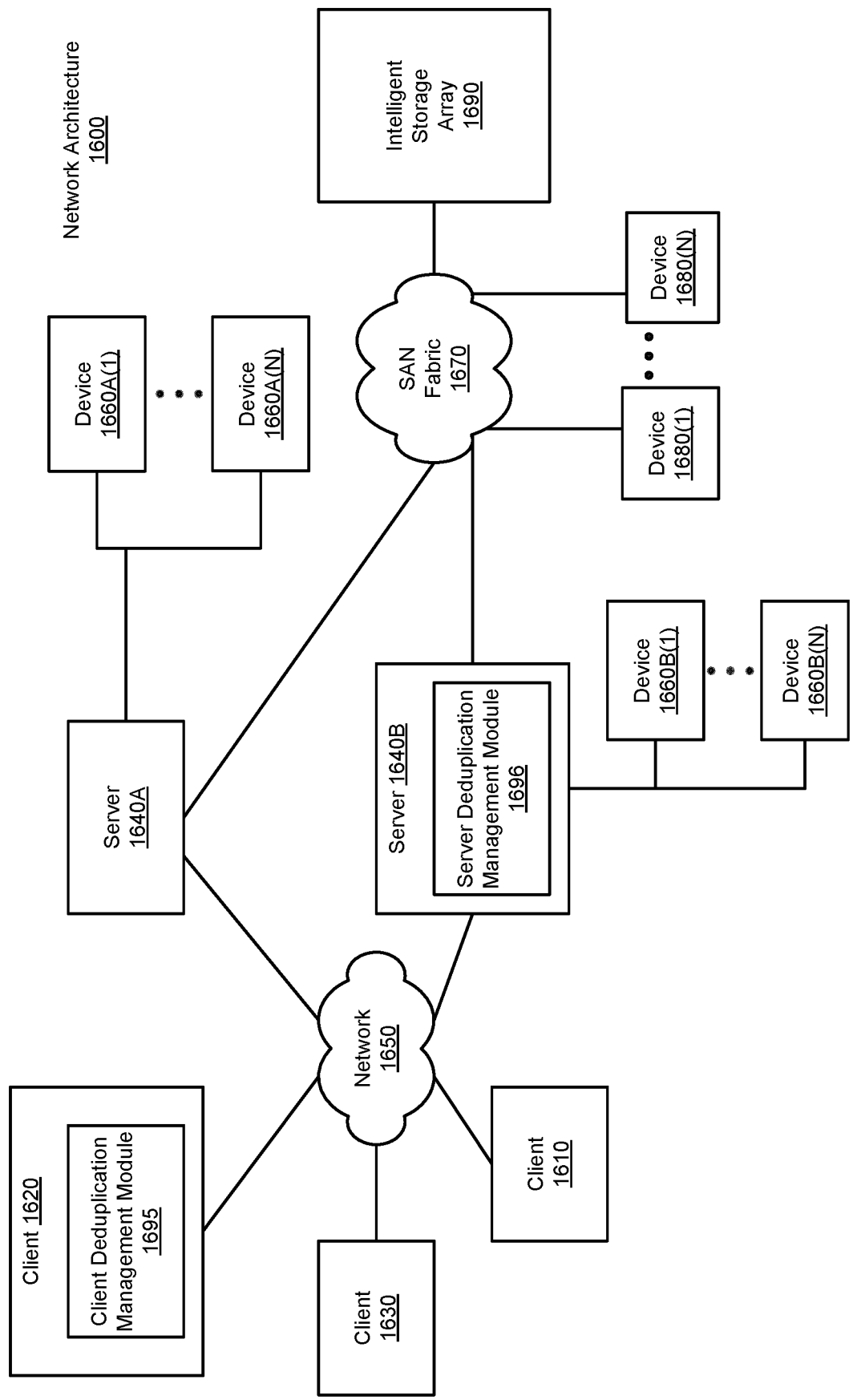
FIG. 16 is a block diagram depicting a network architecture suitable for implementing embodiments of methods and systems such as those disclosed herein.

FIG. 16 is a block diagram depicting a network architecture 1600 in which client systems 1610, 1620 and 1630, as well as storage servers 1640A and 1640B (any of which can be implemented using computer system 1610), are coupled to a network 1650. Storage server 1640A is further depicted as having storage devices 1660A(1)-(N) directly attached, and storage server 1640B is depicted with storage devices 1660B(1)-(N) directly attached. Storage servers 1640A and 1640B are also connected to a SAN fabric 1670, although connection to a storage area network is not required for operation. SAN fabric 1670 supports access to storage devices 1680(1)-(N) by storage servers 1640A and 1640B, and so by client systems 1610, 1620 and 1630 via network 1650. An intelligent storage array 1690 is also shown as an example of a specific storage device accessible via SAN fabric 1670.

Also depicted as part of network architecture 1600 are a client deduplication management module 1695 (installed in client 1620), and a server deduplication management module 1696 (installed in server 1640B), which are comparable in function and operation to various of the deduplication management modules described earlier herein.

With reference to computer system 1510, modem 1547, network interface 1548 or some other method can be used to provide connectivity from each of client computer systems 1610, 1620 and 1630 to network 1650. Client systems 1610, 1620 and 1630 are able to access information on storage server 1640A or 1640B using, for example, a web browser or other client software (not shown). Such a client allows client systems 1610, 1620 and 1630 to access data hosted by storage server 1640A or 1640B or one of storage devices 1660A(1)-(N), 1660B(1)-(N), 1680(1)-(N) or intelligent storage array 1690. FIG. 16 depicts the use of a network such as the Internet for exchanging data, but the systems described herein are not limited to the Internet or any particular network-based environment.

Other Embodiments

The systems described herein are well adapted to attain the advantages mentioned as well as others inherent therein. While such systems have been depicted, described, and are defined by reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

The foregoing describes embodiments including components contained within other components (e.g., the various elements shown as components of computer system 1210). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the systems described herein have been described in connection with several embodiments, these embodiments and their descriptions are not intended to be limited to the specific forms set forth herein. On the contrary, it is intended that such embodiments address such alternatives, modifications, and equivalents as can be reasonably included within the scope of the appended claims.

What is claimed is:

1. A computer-implemented method, implemented in a computer system, comprising:
grouping a plurality of data objects into a plurality of data object groups, wherein
the grouping is performed based, at least in part, on one or more characteristics of the plurality of data object groups and one or more thresholds,
the plurality of data objects is or will be stored in a deduplicated file system,
the deduplicated file system is stored in a storage unit of the computer system,
the deduplicated file system is configured to be configured for access as a user-space file system by another computer system, and
one or more units of data by a deduplication service of a deduplication system,
one or more data objects of the plurality of data objects are in each data object group of the plurality of data object groups, and
the grouping the plurality of data objects comprises
for each data object of the plurality of data objects,
identifying an identified data object group of the plurality of data object groups, based, at least in part, on one or more characteristics of one or more of the plurality of data object groups,
recording a reference in a group record of a plurality of group records in a catalog for the deduplicated file system, wherein
the reference identifies the each data object,
the group record is for the identified data object group;
for the each data object group of the plurality of data object groups,
adding a group reference for the each data object group to a reference list, when the group reference for the each data object group is not already added to the reference list, wherein
the group reference represents the one or more data objects of the each data object group by identifying the each data object group; and
for another data object,
determining whether the another data object can be added to a data object group of the plurality of data object groups,
in response to a determination that the another data object can be added to the data object group, adding the another data object to the data object group, and
in response to a determination that the another data object cannot be added to the data object group,
creating a new data object group, and
adding the another data object to the new data object group.

2. The method of claim 1, wherein
the plurality of data objects are listed in a change tracking list generated by a change tracker that records write operations to the change tracking list,
the group reference is one of a plurality of group references,
each group reference of the plurality of group references is a data object group identifier of a plurality of data object group identifiers, and
each data object group identifier of the plurality of data object group identifiers corresponds to a data group of the plurality of data object groups.

3. The method of claim 1, further comprising:
detecting a backup operation, wherein
the backup operation is performed on the deduplicated file system, and
in response to detection of the backup operation, performing the grouping and recording.

4. The method of claim 1, wherein the grouping further comprises:
receiving a change tracking stream, wherein
the change tracking stream identifies one or more changes made to one or more data objects of the plurality of data objects; and
for each data object of the one or more data objects of the plurality of data objects, adding the each data object to one of the plurality of data object groups.

5. The method of claim 4, wherein the adding the each data object to the one of the plurality of data object croups comprises:
associating the one or more data objects of the plurality of data objects with the each data object group, wherein the one or more data objects of the plurality of data objects are associated with the each data object group of the plurality of data object groups by the recording the reference in metadata for the one or more data objects.

6. The method of claim 4, wherein
the determining whether the each data object can be added to the one of the plurality of data object groups is based, at least in part, on at least one threshold.

7. The method of claim 6, wherein
the at least one threshold comprises at least one of
a number of data objects that can be included in the one of the plurality of data object groups, or
an amount of data of data objects of the one of the plurality of data object groups that can be included in the one of the plurality of data object groups.

8. The method of claim 6, wherein
the creating comprises
creating a new data object group record for the new data object group, and
associating the each data object with the new data object group, comprising
storing a data object identifier for the each data object in the new data object group record, and
storing a data object group identifier in metadata for the each data object.

9. The method of claim 8, wherein
the creating the new data object group record comprises generating the data object group identifier, and
the data object identifier is retrieved from an entry of the change tracking stream corresponding to the each data object.

10. The method of claim 1, further comprising:
receiving a change tracking stream, wherein
the change tracking stream identifies one or more changes made to one or more data objects of the plurality of data objects, and
each entry of the change tracking stream comprises
a data object identifier of a plurality of data object identifiers, the data object identifier identifying a corresponding one of the one or more data objects of the plurality of data objects, and
information identifying a change to the corresponding one of the one or more data objects of the plurality of data objects.

11. The method of claim 1, further comprising:
performing, for one of the plurality of data object groups, at least one of
a data object write operation for the one of the plurality of data object groups,
a container reference update operation for the one of the plurality of data object groups, or
a path object update operation for the one of the plurality of data object groups.

12. The method of claim 1, further comprising:
performing a deduplication management operation on one of the plurality of data object groups, wherein
the deduplication management operation is one of a group deletion operation, a group update operation, or a group merge operation, and
the deduplication management operation is performed on the one of the plurality of data object groups, rather than on one or more data objects of the one of the plurality of data object groups.

13. The method of claim 12, wherein
the group reference is one of a plurality of group references,
the deduplication management operation is the group deletion operation, which comprises identifying a first data object group to be deleted,
deleting the first data object group, and
performing a dereference operation on a first group reference of the plurality of group references, and
the first group reference refers to the first data object group.

14. The method of claim 12, wherein
the deduplication management operation is the group update operation, which comprises creating another data object group,
deleting a first data object from a first data object group of the plurality of data object groups, and
deleting a second data object from a second data object group of the plurality of data object groups.

15. The method of claim 12, wherein
the deduplication management operation is a group merge operation, comprising
creating another data object group,
adding a first data object, from a first data object of a first data object group, to the another data object group,
adding a second data object, from a second data object of a second data object group, to the another data object group,
deleting the first data object group, and
deleting the second data object group.

16. A non-transitory computer-readable storage medium, comprising program instructions, which, when executed by one or more processors of a computing system, perform a method comprising:
grouping a plurality of data objects into a plurality of data object groups, wherein
the grouping is performed based, at least in part, on one or more characteristics of the plurality of data object groups and one or more thresholds,
the plurality of data objects is or will be stored in a deduplicated file system,
the deduplicated file system is stored in a storage unit of the computer system,
the deduplicated file system is configured to be configured for access as a user-space file system by another computer system, and
one or more units of data by a deduplication service of a deduplication system,
one or more data objects of the plurality of data objects are in each data object group of the plurality of data object groups, and
the grouping the plurality of data objects comprises
for each data object of the plurality of data objects, identifying an identified data object group of the plurality of data object groups, based, at least in part, on one or more characteristics of one or more of the plurality of data object groups,
recording a reference in a group record of a plurality of group records in a catalog for the deduplicated file system, wherein
the reference identifies the each data object,
the group record is for the identified data object group;
for the each data object group of the plurality of data object groups,
adding a group reference for the each data object group to a reference list, when the group reference for the each data object group is not already added to the reference list, wherein
the group reference represents the one or more data objects of the each data object group by identifying the each data object group; and
for another data object,
determining whether the another data object can be added to a data object group of the plurality of data object groups,
in response to a determination that the another data object can be added to the data object group, adding the another data object to the data object group, and
in response to a determination that the another data object cannot be added to the data object group, creating a new data object group, and
adding the another data object to the new data object group.

17. The non-transitory computer-readable storage medium of claim 16, wherein
the plurality of data objects are listed in a change tracking list generated by a change tracker that records write operations to the change tracking list,
the group reference is one of a plurality of group references,
each group reference of the plurality of group references is a data object group identifier of a plurality of data object group identifiers, and
each data object group identifier of the plurality of data object group identifiers corresponds to a data group of the plurality of data object groups.

18. The non-transitory computer-readable storage medium of claim 16, wherein the method further comprises:
detecting a backup operation, wherein
the backup operation is performed on the deduplicated file system, and
in response to detection of the backup operation, performing the grouping and the recording.

19. The non-transitory computer-readable storage medium of claim 16, wherein the grouping further comprises:
receiving a change tracking stream, wherein
the change tracking stream identifies one or more changes made to one or more data objects of the plurality of data objects; and
for each data object of the one or more data objects of the plurality of data objects, adding the each data object to one of the plurality of data object groups, wherein
the adding the each data object to the one of the plurality of data object groups comprises
associating the one or more data objects of the plurality of data objects with the each data object group, wherein the one or more data objects of the plurality of data objects are associated with the each data object group of the plurality of data object groups by the recording the reference in metadata for the one or more data objects.

20. The non-transitory computer-readable storage medium of claim 16, wherein the grouping further comprises:
receiving a change tracking stream, wherein
the change tracking stream identifies one or more changes made to one or more data objects of the plurality of data objects; and
for each data object of the one or more data objects of the plurality of data objects, adding the each data object to one of the plurality of data object groups, wherein
the adding the each data object to the one of the plurality of data object groups comprises
determining whether the each data object can be added to the one of the plurality of data object groups, and
in response to a determination that the each data object cannot be added to the one of the plurality of data object groups,
creating another new data object group, and
adding the each data object to the another new data object group.

21. A computing system comprising:
one or more processors; and
a computer-readable storage medium coupled to the one or more processors, comprising program instructions, which, when executed by the one or more processors, perform a method comprising
grouping a plurality of data objects into a plurality of data object groups, wherein
the grouping is performed based, at least in part, on one or more characteristics of the plurality of data object groups and one or more thresholds,
the plurality of data objects is or will be stored in a deduplicated file system,
the deduplicated file system is stored in a storage unit of the computer system,
the deduplicated file system is configured to be configured for access as a user-space file system by another computer system, and
one or more units of data by a deduplication service of a deduplication system,
one or more data objects of the plurality of data objects are in each data object group of the plurality of data object groups, and
the grouping the plurality of data objects comprises
for each data object of the plurality of data objects,
identifying an identified data object group of the plurality of data object groups, based, at least in part, on one or more characteristics of one or more of the plurality of data object groups,
recording a reference in a group record of a plurality of group records in a catalog for the deduplicated file system, wherein
the reference identifies the each data object,
the group record is for the identified data object group,
for the each data object group of the plurality of data object groups,
adding a group reference for the each data object group to a reference list, when the group reference for the each data object group is not already added to the reference list, wherein
the group reference represents the one or more data objects of the each data object group by identifying the each data object group, and for another data object,
determining whether the another data object can be added to a data object group of the plurality of data object groups,
in response to a determination that the another data object can be added to the data object group, adding the another data object to the data object group, and
in response to a determination that the another data object cannot be added to the data object group, creating a new data object group, and
adding the another data object to the new data object group.

\* \* \* \* \*